(12) United States Patent
Saint et al.

(10) Patent No.: US 6,283,870 B1
(45) Date of Patent: Sep. 4, 2001

(54) MOTOR MECHANISM FOR CHILD'S SWING

(75) Inventors: David Saint; James Sack, both of Elverson, PA (US)

(73) Assignee: Graco Children's Products Inc., Elverson, PA (US)

( * ) Notice: Subject to any disclaimer, the term of this patent is extended or adjusted under 35 U.S.C. 154(b) by 0 days.

(21) Appl. No.: 09/171,949

(22) PCT Filed: Nov. 12, 1996

(86) PCT No.: PCT/US96/17898

§ 371 Date: Feb. 18, 1998

§ 102(e) Date: Feb. 18, 1998

(87) PCT Pub. No.: WO97/18392

PCT Pub. Date: May 22, 1997

Related U.S. Application Data

(63) Continuation-in-part of application No. 08/556,603, filed on Nov. 13, 1995, now Pat. No. 5,788,014.

(51) Int. Cl.[7] .................................................. A63G 9/16
(52) U.S. Cl. ............................................. 472/119; 185/43
(58) Field of Search .................... 472/118, 119, 472/125; 185/14, 39, 400, 44

(56) References Cited

U.S. PATENT DOCUMENTS

| | | | |
|---|---|---|---|
| 2,341,332 | 2/1944 | Pudelko | 185/43 |
| 2,637,987 | 5/1953 | Hill et al. | 64/29 |
| 2,979,734 | 4/1961 | Saint et al. | 5/109 |
| 3,450,365 | 6/1969 | Kaplan | 242/67.4 |
| 3,804,407 | 4/1974 | Saint | 272/86 |
| 3,893,554 | 7/1975 | Wason | 192/56 |
| 4,165,872 | 8/1979 | Saint | 272/86 |
| 4,323,233 | 4/1982 | Gebhard | 272/86 |
| 5,083,773 | 1/1992 | Saint | 272/86 |
| 5,378,196 | * 1/1995 | Pinch et al. | 472/119 |
| 5,788,014 | 8/1998 | Saint | 185/43 |

* cited by examiner

*Primary Examiner*—Kien T. Nguyen
(74) *Attorney, Agent, or Firm*—Foley & Lardner

(57) ABSTRACT

A spring motor mechanism for use with a child's swing (100) that includes a spring (300) attached to a slip clutch device (400) to prevent the spring (300) from beconing over wound. In addition, the spring motor mechanism includes an indecator (800) which reveals the amount of torsional energy stored in the spring (300). This can be used by an operator to approximate the time remaining before the spring (300) must be re-wound. The invention also includes an adjustable swing height system (700) that allows the operator of the swing to determine a maximum swing height and also prevents the over-swinging of the child seat (116).

38 Claims, 23 Drawing Sheets

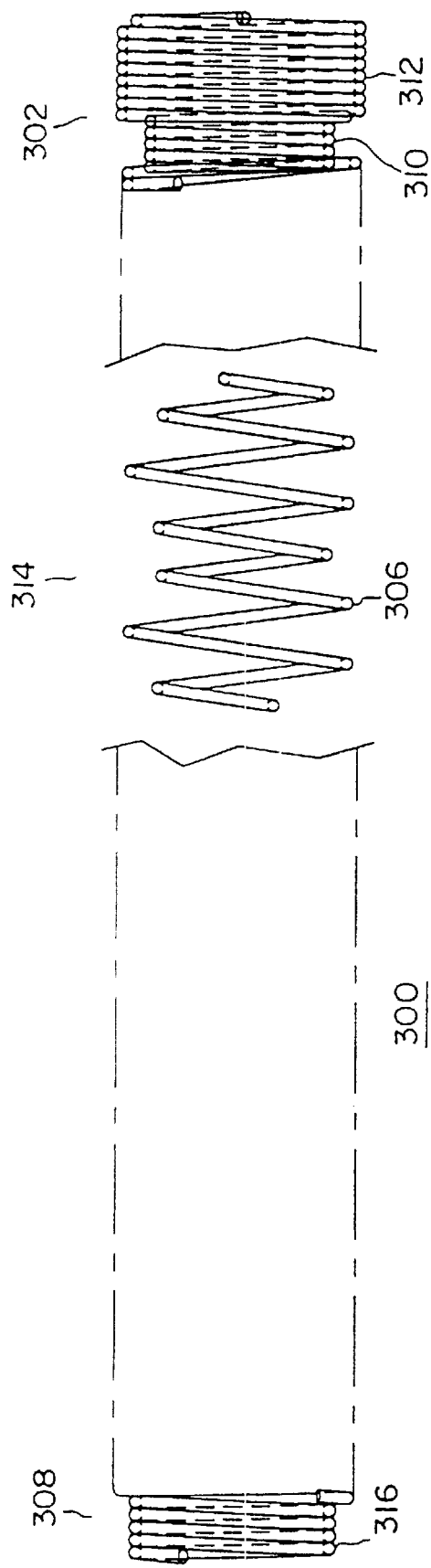
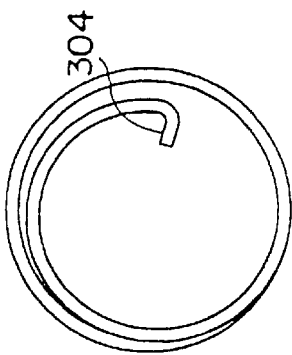
FIG.3A
FIG.3B
FIG.3C

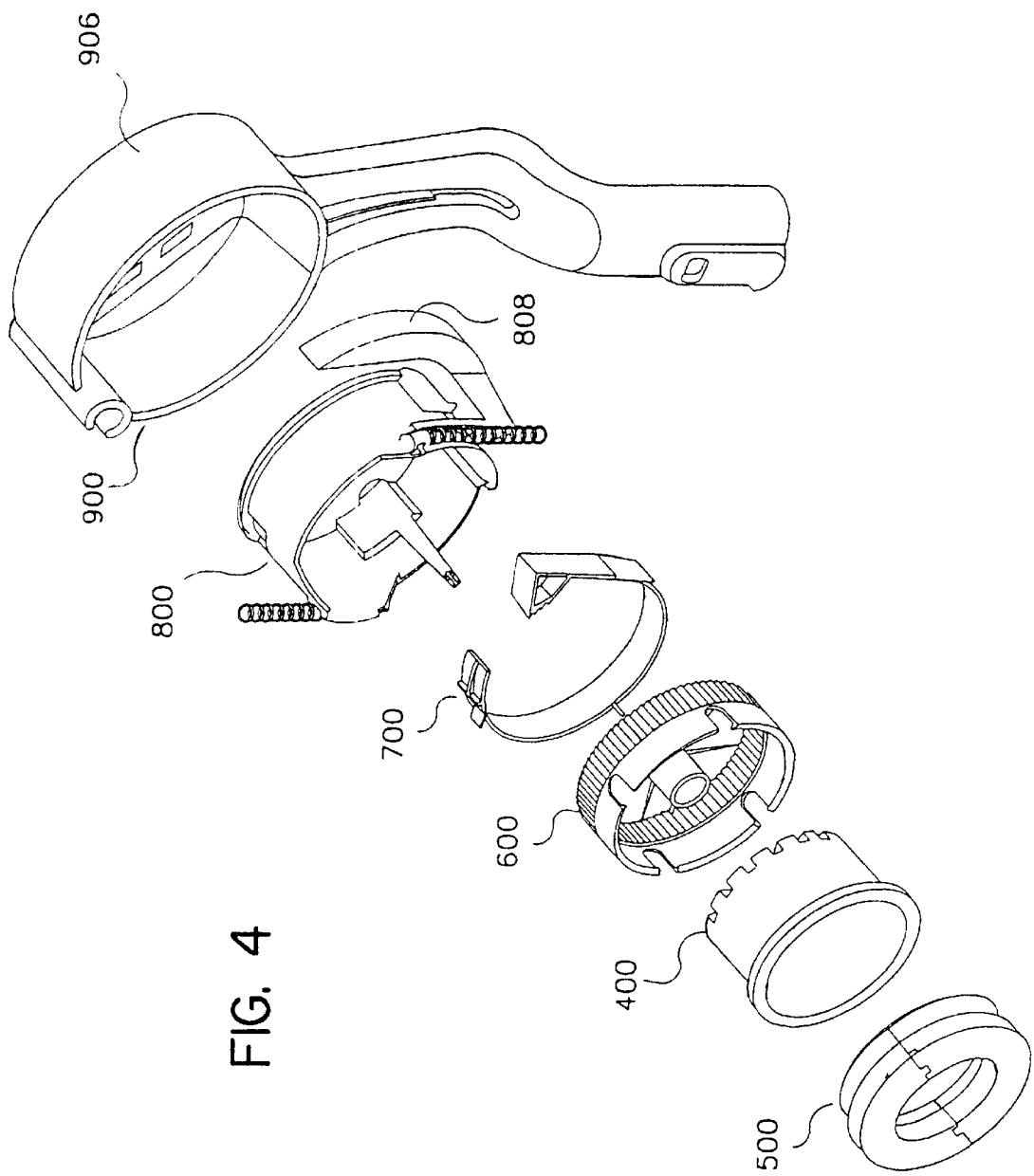

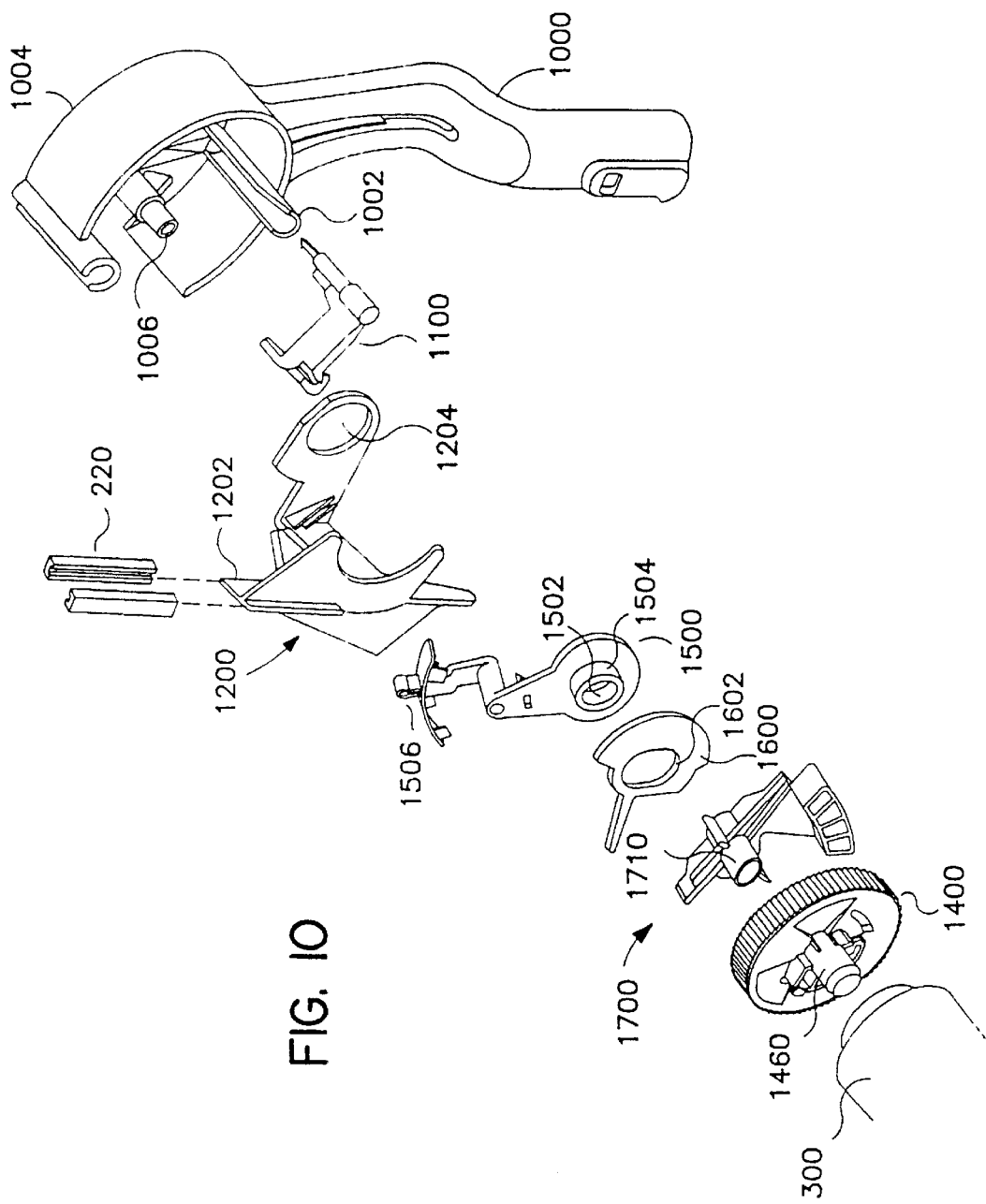

MOTOR MECHANISM FOR CHILD'S SWING

This application is a continuation-in-part of U.S. application Ser. No. 08/556,603, filed Oct. 13, 1995, now U.S. Pat. No. 5,788,014.

BACKGROUND OF THE INVENTION

1. Field of the Invention

The present invention relates to a spring motor mechanism, and in particular, to a spring, motor mechanism for use in a child's swing having an adjustable swing height control mechanism, an over-wind protection device, and a remaining swing run indicator device.

2. Description of the Related Art

Spring motor mechanisms are well known and subject to various applications, however, they are especially suited for use in a child's swing and will therefore be particularly described in that connection. Child swings are often powered by a torsion spring, typically formed from wire, that receives and stores an input torque when wound by an operator through use of a handle linked to a crank shaft. The handle and crankshaft are typically located at the "escapement end" of the device, controls the release of the torque stored in the spring to sustain a decreasing, periodic oscillation that drives a swing seat containing a child.

Springs used in known spring motor mechanisms typically include a plurality of coils. As the spring is wound, the number of these coils increases while the diameter of each coil decreases. In this way, the length of the spring grows while its diameter shrinks. Springs often have coils within coils in a "telescope" fashion to allow room for additional coils within a limited space.

The energy generated during winding is stored in the spring, and this energy is released as the spring unwinds to oscillate the swing. The stored energy will continue to be released as the added spring coils unwind. Accordingly, for purposes of swing duration, it is the number of additional coils created during winding that is significant rather than the actual amount of torque that has been stored in the spring.

Spring motor mechanisms driven by wound torsion springs suitable for use in a child's swing are previously known and have been disclosed, for example, in U.S. Pat. Nos. 4,165,872 to Saint and 5,083,773 to Saint, among others. In the known device, the torsion spring is wound to create a torque that acts upon a ratchet wheel and a carriage thereby causing the swing, which is attached to the carriage, to oscillate.

In the known mechanism, the winding end of the device includes a handle and crankshaft structure as discussed above. The crank shaft is directly connected to the spring so that the rotation of the handle and crankshaft winds the spring. As discussed above, the rotational force applied to the spring by the rotating handle tightens the spring coils causing the coils to shrink in diameter. Eventually, with over winding, the wire spring will deform plastically, possibly damaging the torsion spring. Thus, a first disadvantage with known spring motor mechanisms is that the spring may become damaged if it is overwound by the operator.

Of course, repeated over winding of the spring can place substantial stress and strain on the main spring. If the main spring should inadvertently become disengaged with either the wind end or the escapement end, or if the main spring breads, the spring could begin to unwind rapidly, and generate an alarming sound.

Conventional spring motor mechanism unwind quickly and suffer from the disadvantage of failing to function for extended periods of time before requiring additional winding. Because the conventional spring motor mechanism is contained within a housing, the user cannot determine how tightly the spring is wound. Conventional spring motor mechanism do not provide the operator with an indication of the number of swing oscillations that can be completed before the spring must be rewound (i.e., the amount of stored energy remaininig in the spring).

Another disadvantage of conventional spring motor mechanisms relates to the nonlinear release of energy form the spring over time as the child swinigs. Specifically as the conventional spring motor mechanism first begins to unwind, the spring mechanism generates a relatively high torque output which swings the child very high. As the spring mechanism unwinds, the torque generated decreases, and the child swing decreases in amplitude. Consequently known spring motor mechanisms can over swing the child as the spring initially unwinds and under swing the child as the springs finishes unwinding.

Known spring motor mechanisms also do not account for variations in the child's weight. Thus, a conventional spring motor mechanism that supplies sufficient torque to appropriately swing a larger heavier child tends to over-swing a smaller lighter child.

SUMMARY OF THE INVENTION

A first object of the present invention is therefore to provide a spring motor mechanism for use in a child's swing that prevents over-winding by the operator. A second object of the present invention is to provide a spring motor mechanism wherein the spring is prevented from unwinding rapidly and uncontrollably. A third object of the present invention is to provide a spring motor mechanism that will generate an increased number of swing oscillations. A fourth object of the present invention is to provide a more accurate indication to the operator of the number of remaining oscillations that can be completed before the spring must by re-wound.

A fifth object of the present invention is to provide a swing that does not oscillate excessively high during initial spring unwinding. A sixth object of the present invention is to provide a spring motor mechanism that can satisfactorily oscillate either a relatively heavy child or a relatively light weight child.

A seventh object of the present invention is to provide a swing housing having rounded edges and that is less of an obstacle when the child user is put in and removed from the child swing. A eighth object of the present invention is to provide a swing housing that is closed at the bottom even when the swing is oscillating, to prevent injury to the operator or child user. A ninth object of the present invention is to provide a swing, that has swing arms that are consistently bent at a proper angle to allow the swing to oscillate longer and in a balanced fashion. A tenth object of the present invention is to provide a handle that does not have an exposed crank wire that could pinch the user's fingers. An eleventh object of the present invention is to provide an internal spring mechanism that is simpler to assemble. A twelfth object of the present invention is to provide an internal spring mechanism that does not generate a noise when it is being wound.

To achieve these and other advantages and in accordance with the purpose of the invention, as embodied and broadly described, the invention provides an over-wind protection system to prevent the over-winding of a motor mechanism for a child swing, comprising a main spring having an energy storing section and an end section, and a spring sleeve having an opening and an inner surface with the end section of the main spring being disposed adjacent to the inner surface, the end section being compressed and exerting an outward force on the inner surface such that the end section and the spring sleeve are fixedly attached when the main spring applies a torque below a predetermined maximum torque is exceeded.

In addition, the invention provides for a wind indicator disposed within a housing, for displaying a relative torque provided by a main spring to the wind indicator comprising a spring coupling connected to an end of the main springs and indicator engaged with the spring coupling for receiving a torque transferred from the main spring, the indicator capable of rotating in response to an applied torque, and a bias spring engaged with the indicator and the housing to provide a counter torque opposite to the main spring torque Such that the indicator's rotational position is altered in response to the torque applied by the main spring and the counter torque applied by the bias spring.

The invention provides for an adjustable swing mechanism for controlling the oscillation angle of a child swing that is powered by torque stored in a main spring comprising a ratchet gear having a plurality of teeth, the ratchet gear being connected to a main spring, a pawl located adjacent to the ratchet gear, the pawl engaging with the ratchet gear while the ratchet gear is rotating in a direction counter to the torque stored in the spring and disengaging with the ratchet gear while the ratchet gear is rotating in a direction identical to the torque stored in the spring, a dog located adjacent to the ratchet gear, the dog engaging with the ratchet gear while the ratchet gear is rotating in a direction identical to the torque stored in the spring and disengaging with the ratchet gear while the ratchet gear is rotating in a direction counter to the torque stored on the spring, an actuator located adjacent to the dog and pawl for controlling the engagement and disengagement of the dog and the pawl with the ratchet gear such that the dog and pawl engage with each sequential, counterclockwise tooth of the ratchet gear after each oscillation, and an adjustable actuator located adjacent to the dog to direct the dog into the same ratchet tooth on successive oscillations when the maximum oscillation angle of a child swing exceeds a predetermined amount.

It is to be understood that both the foregoing general description and the following, detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate one embodiment of the invention and together with the written description serve to explain the principles of the invention. In the drawings:

FIG. 3A is a front view of the main spring;

FIG. 3B is an end view of the main spring;

FIG. 3C is an end view of the other end of the main spring;

FIG. 4 is an exploded view of the wind end of the components adjacent to the driven hanger;

FIG. 10 is an exploded view of the escapement end of the swing;

DETAILED DESCRIPTION OF THE PREFERRED EMBODIMENTS

Reference will now be made in detail to the present preferred embodiment of the invention, an example of which is illustrated in the accompanying drawings.

Figure 1:
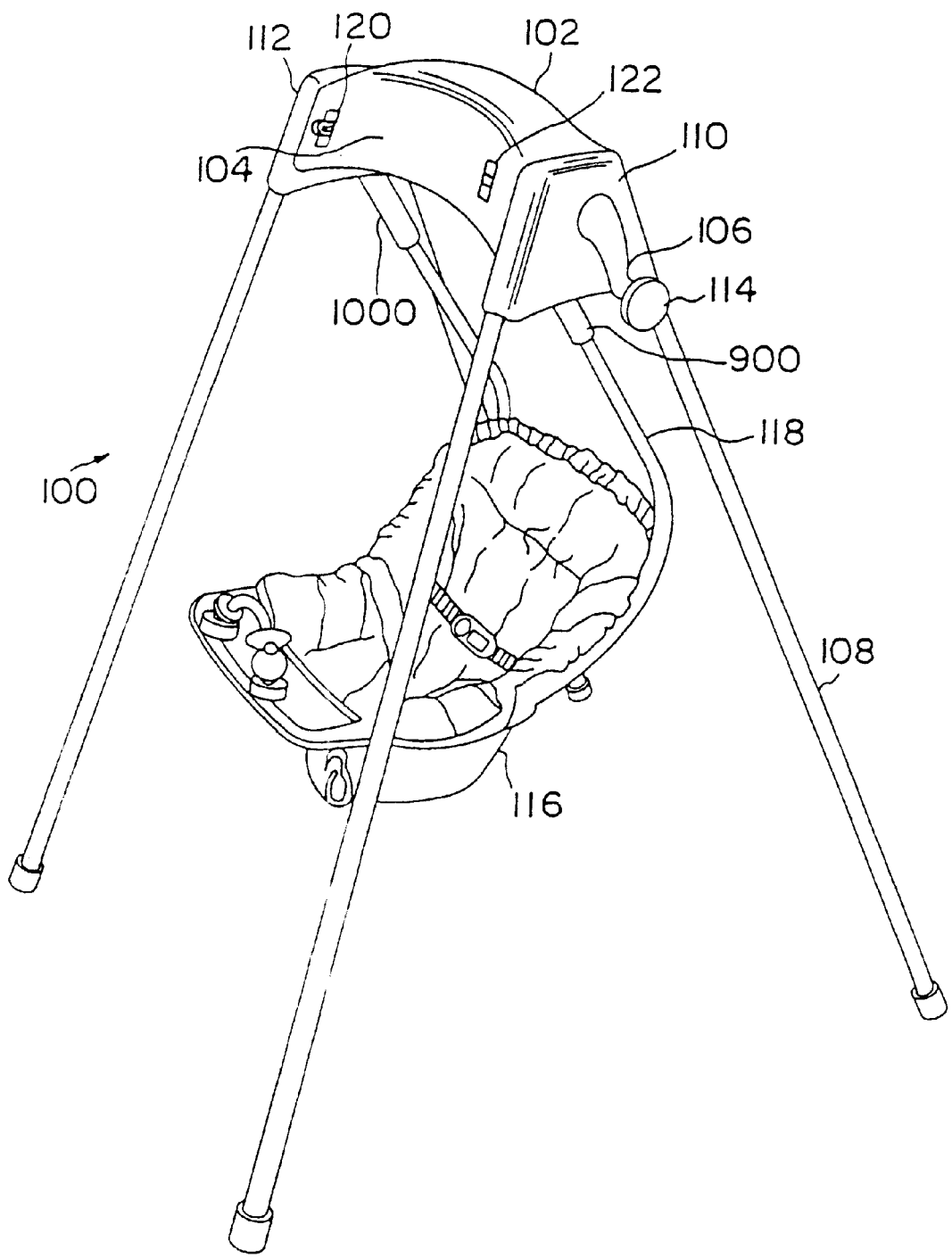
FIG. 1 is a perspective view of the child swing.

As shown in FIG. 1, swing 100 includes housing 102 that is preferably formed from a sturdy, molded plastic material. The housing 102 fully encloses the interior parts of the device to both protect the interior parts of the device from dust and debris, and also to protect the operator from possible injury resulting from contact with those interior parts. The bottom of housing 102 preferably includes are two narrow slots 212 (see FIG. 2A) that allow a first hanger 900 and a second hanger 1000 to connect the seat 116 to the interior mechanical parts of the swing mechanism.

The housing 102 also includes two slots 120 and 122. Slot 122 permits the swing operator to view the wind indicator, discussed below, which is functionally similar to a fuel gage, it indicates an approximation of remaining spring energy. The second slot 120, allows the user to select a maximum swing arc. These features will be discussed below.

The preferred housing 102 includes rounded edges to prevent injury to the user's head in the event of an inadvertent collision with an edge of the housing. For this reason, housing 102 has a front side 104 that is generally concave with rounded edges to allow the operator additional room to remove the user from child seat 116.

Another function of the housing is to support a crank 106. Crank 106 includes Knob 114 and is connected to a shaft 210 (see FIG. 2A) which, in turn, is connected to a main spring 300 (see FIG. 2A) within housing 102. Rotation of the crank 106 causes a rotation of the shaft 210 thereby supplying energy to the main spring 300 (see FIG. 2A).

Another function of the housing 102 is to receive legs 108 that elevate and support swing 100. Accordingly, the housing 102 has a first side 10 and a second side 112 (partially hidden in FIG. 1) which are each roughly triangular in shape to secure legs 108 in such a manner that they can be positioned in a spread fashion during operation of the swing 100 to increase the stability of the device. The first side 110 also supports handle 106.

Yet another function of the housing 102 is to support child seat 116. Accordingly, two support alms 118 are suspended from housing 102 and attached to the hangers 900 and 1000. Support arms 118 are preferably curved to reach under and grasp the child seat. During operation of the swing, main spring 300 (see FIG. 2A) transfers its energy to oscillate support arms 118 which, in turn, oscillate child seat 116.

Figure 2A:
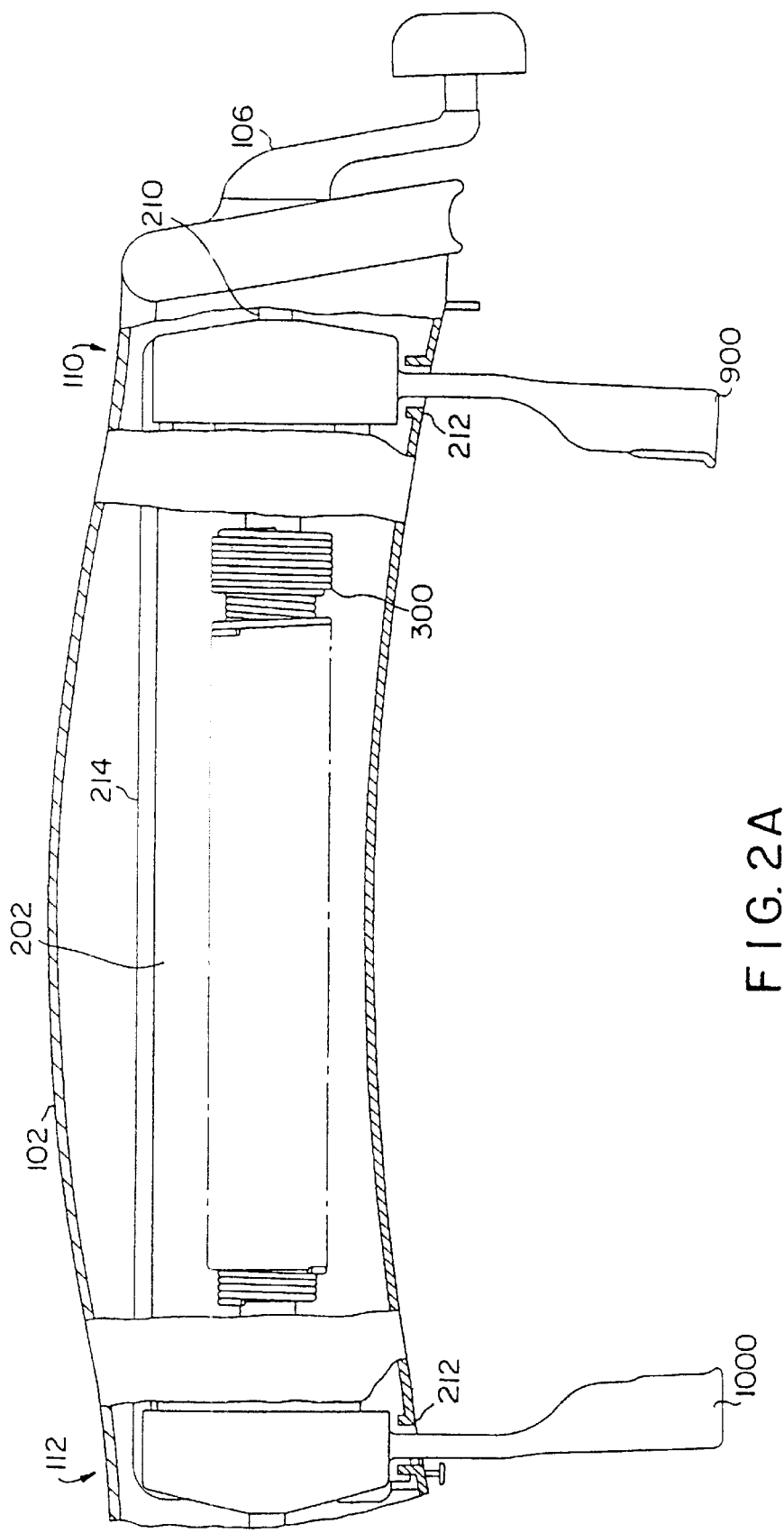
FIG. 2A is a cross-sectional schematic view of the child swing housing.
Figure 2B:
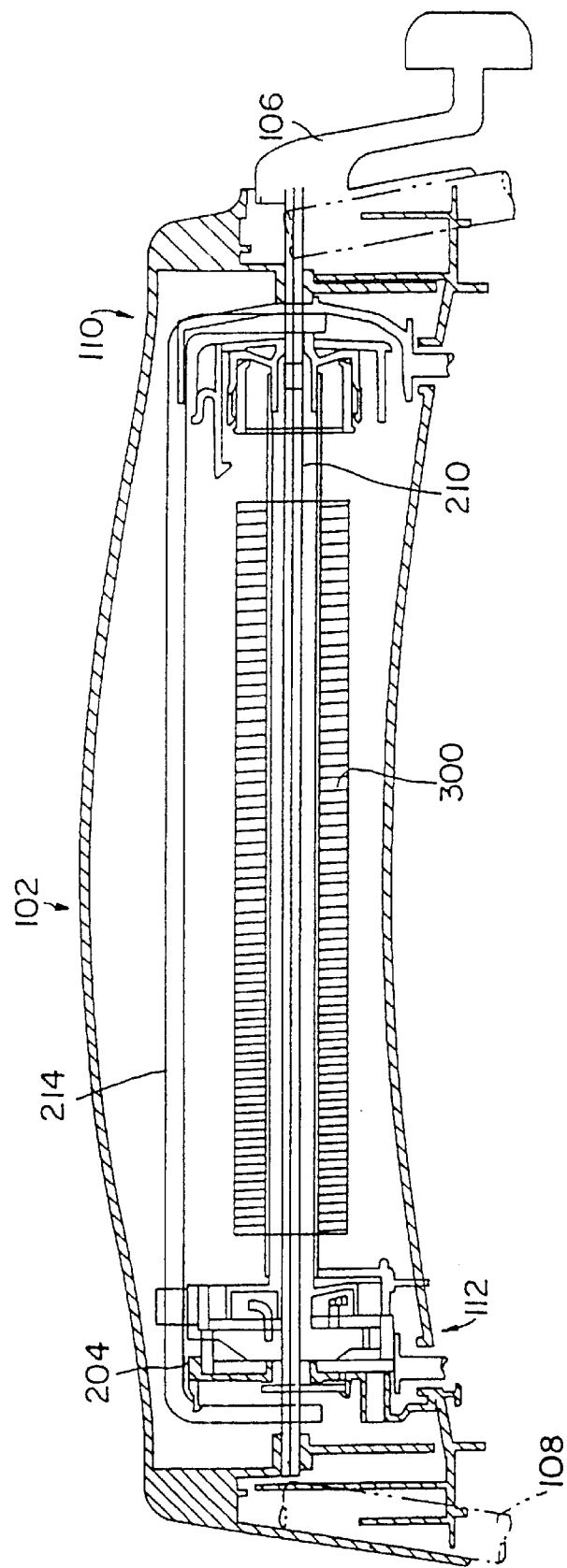
FIG. 2B is a more detailed cross-sectional view of the housing.

FIGS. 2A and 2B show the inner workings of the housing 102. The first side 110 of the housing 102 is a wind end that is adjacent to the crank 106. The crank 106 is connected to the shaft 210 which extends across the entire length of the housing 102. Both hangers 900 and 1000 are supported by the shaft 210.

First hanger 900, generally referred to as the driven hanger because it is rotationally mounted to the shaft and not powered and the second hanger 1000, generally referred to as the driving hanger because it receives power from the spring, are synchronized by a unison wire 214. This unison wire 214 rotationally couples the driving hanger 1000 with he driven hanger 900 and stabilizes the housing and swing about horizontal and vertical axes from excess or unwanted motion.

FIG. 2B shows the interior parts of the housing 102 in greater detail. Wind end 110 receives input torque from crank 106 and applies it to main sprint 300. Wind end 110 includes a slip clutch, which prevents main spring 300 from becoming over-wound, and a wind indicator system which indicates the approximate number of oscillations that remain before main spring 300 must be re-wound (i.e., the amount of stored energy remaining in the spring). As discussed below, the wind indicator system measures the level of torque generated by the spring, at a given point in time. This information can then be used by the operator to estimate the number of times the swing can oscillate before the spring must be re-wound.

Located on a second side 112 of housing 102 is an escapement end 204. Escapement end 208 receives an output torque from main spring 300 and converts it to a rotational force that can be used to swing the child seat 116. Escapement end 204 includes a swing height adjuster that can be used to control the height of the oscillation of child seat 116 and lengthen the duration of the swing operation before the spring must be re-wound. The features of wind end 110 and escapement end 204 will be discussed in further detail below.

FIGS. 3A, 3B and 3C show details of the main spring 300). The main spring 300 receives and stores rotational energy generated during the winding of crank 106. Although some springs have coils of uniform size, the preferred coils 306 of main spring 300 have several different diameters. FIG. 3A show s the coils 306 of main spring; 300 where the coils are not of uniform diameter, but instead are of variable diameter so that they can fit "telescope style" within one another.

An exemplary embodiment of the main spring 300 has a larger diameter slip coil section 312, a small diameter neck section 310, a variable diameter power section 314 and a small diameter mounding section 316. FIG. 3A shows an end of main spring 300 that includes neck section 310 and slip coil section 312. Slip coil section 312 has a greater diameter than neck section 310 so that the slip coil section can be wound down for insertion into a spring, sleeve 400 (see FIG. 6A) to create and expansion force that secures the main spring within the spring sleeve.

FIG. 3B shows an end of main spring 300 where bent end portion 305 is configured to engage a portion of the escapement assembly. FIG. 3C shows the other end of main spring 300 with a reduced diameter bent end portion 304 that is desigined to engage a projecting portion 618 (see FIG. 6A).

Wind end 110 includes several mechanisms which assist the main spring 300 to accumulate and retain an appropriate amount of torsional energy. FIG. 4 shows generally the parts that comprise this portion of the invention and their relationship with one another. The parts include a grip 500, a sleeve 400, sleeve cover 600, back wind stop 700 and indicator 800. Driven hanger 900 is not rotationally coupled to any of the members and free wheels on shaft 212. The indicator 800 inserts inside of the circular portion 906 of the driven hanger 900. However, the display panel 808 of the indicator is disposed radially outward of the circular portion 906. This allows the user to view the display panel 808 through slot 122 (see FIG. 1).

Figure 5:
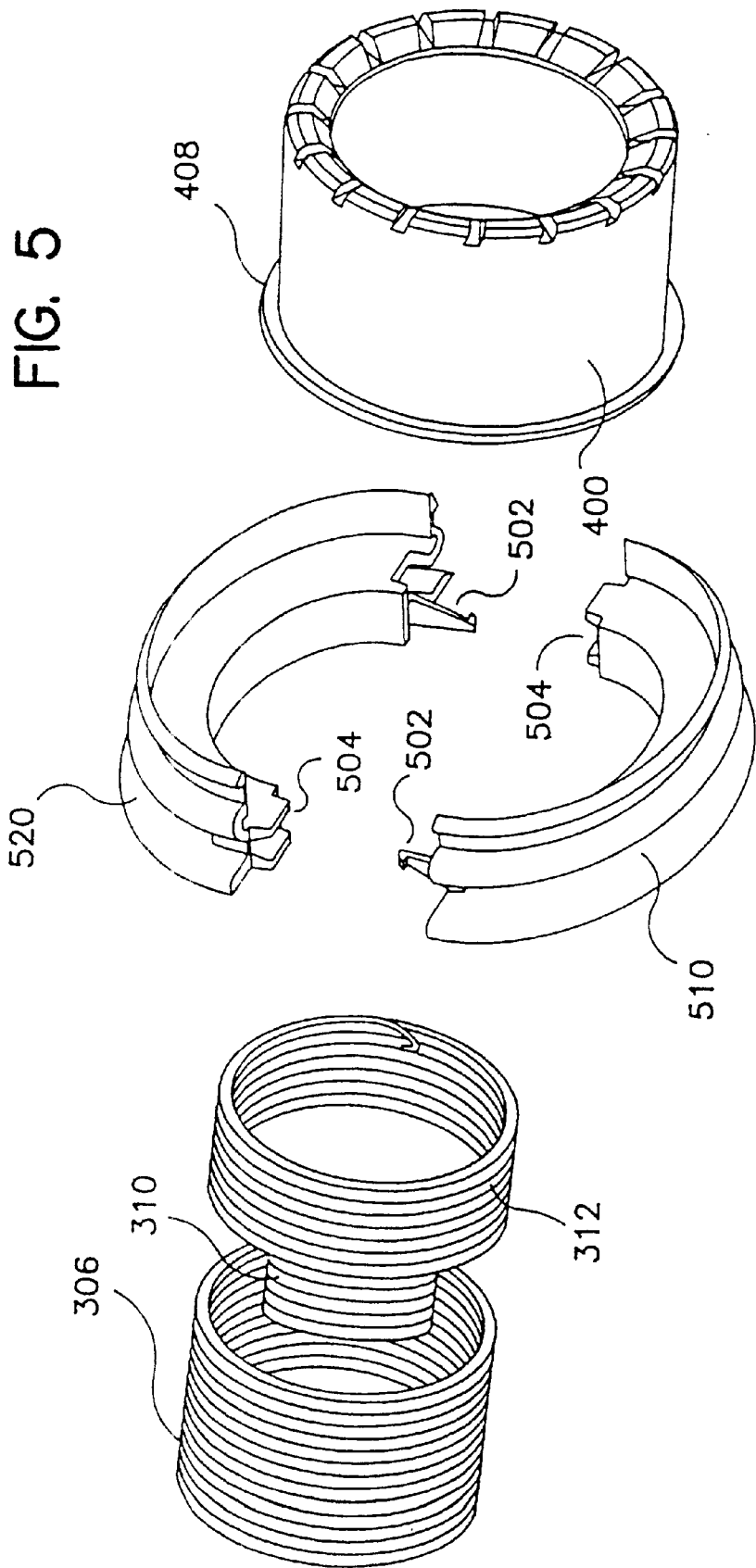
FIG. 5 id an exploded view the sleeve, grip and main spring.

FIG. 5 shows the initial stages of assembly of the main spring 300 with grip 500 and sleeve 400. First, slip coils 312 of main spring 300 are temporarily wound tightly and slightly smaller that the inner diameter of the spring sleeve 400 for insertion into spring sleeve 400. The slip coils are then allowed to unwind and expand to press against an inner surface 402 of The spring sleeve.

The grip 500 preferably includes two identical, semi-circular portions that can be joined together when assembled around the spring sleeve outer lip 408. The two semi-circular portions 510 and 520 of grip 500 each have a tab 502 and slot 504 on opposite ends that engage to lock the two portions together when they are in place. When the two identical portions of spring sleeve grip 500 connect, tab 502 clips in and engages with slot 504.

Figure 6A:
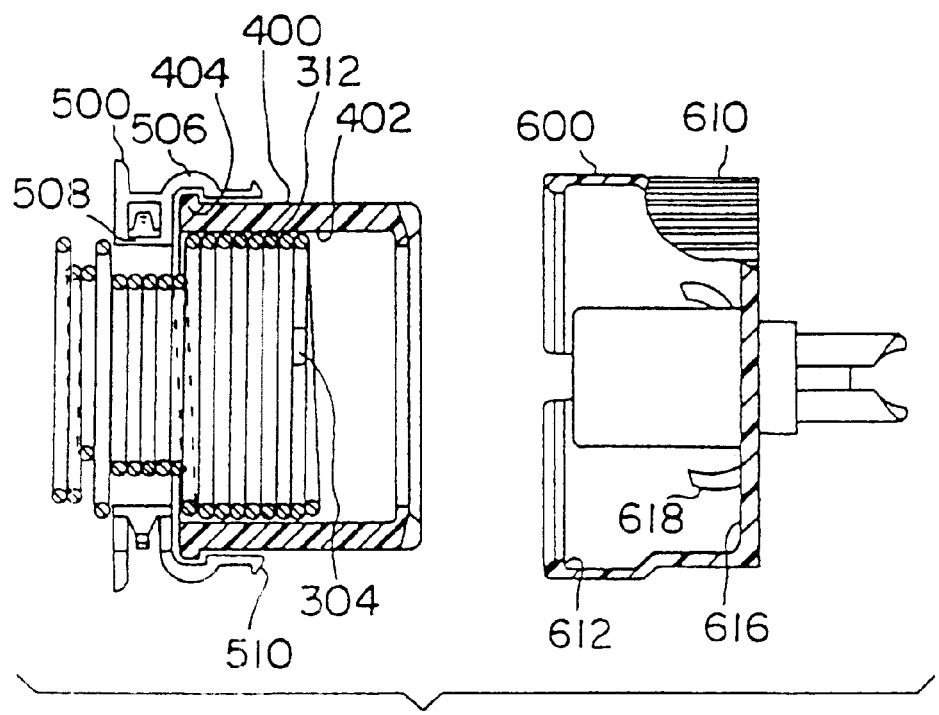
FIG. 6A is an assembly cross-sectional view of the sleeve and the cover.

FIG. 6A shows the main spring 300, the grip 500 and the sleeve 400 after assembly. After main spring 300 is inserted into spring sleeve 400, and the two portions of spring sleeve grip 500 are snapped around spring sleeve 400 and main spring 300, outer lip 404 will engage with groove 506 on the interior side of grip 500. Cylindrical extension 508, which is adjacent to the tab 502 and slot 504, retains the neck 310 of the main spring 300 to assure that main spring 300 does not inadvertently slide out of the spring sleeve. In this way, sleeve 400 and grip 500 cooperate to grasp and hold main spring 300 and prevent main spring 300 from disengaging and unwinding quickly and uncontrollably. However, as described above, spring sleeve grip 500 grips main spring 300 and spring sleeve 400 in such a way that the main spring can rotate and slide within the spring sleeve when a predetermined torque has been exceeded.

FIG. 6A also shows the assembled spring 300, sleeve 400 and grip 500 just prior to assembly with the cover 600. For clarity, only a portion of the gears 610 found on the outer surface of the cover are shown. Also, for clarity, the elements in all the Figures are not shown to scale (note especially the cut lines on the cover 600). The grip 500 has a circular, circumferential bayonet lock 510 which is designed to cooperate with a corresponding shoulder 612 on the cover. Once the sleeve 400 and grip 500 are assembled together with cover 600, two additional elements mate.

Figure 6B:
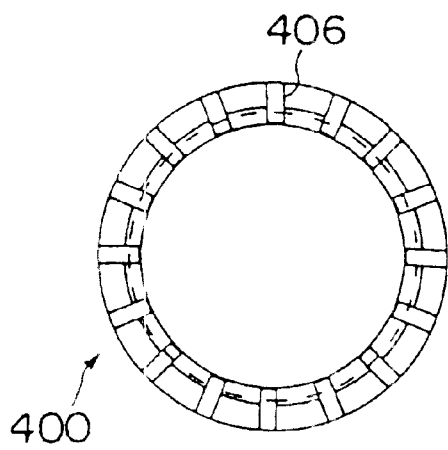
FIG. 6B is a front view of the axial lace of- the sleeve.
Figure 6C:
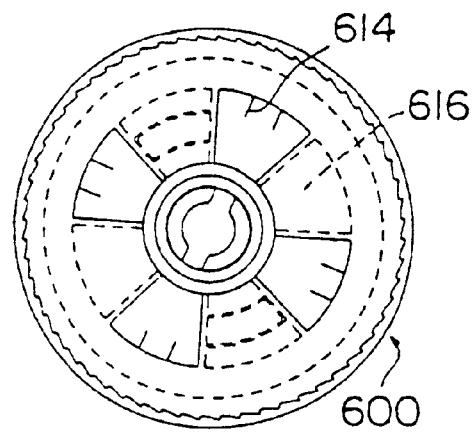
FIG. 6C is a front view of the axial face of the cover.

FIG. 6B and 6C show the two adjacent, mating end faces of sleeve 400 and cover 600. Radial slots 406 disposed on the end face of sleeve 400 mate with radial ribs 614, which are disposed on the bottom inner surface 616. Because of these slots 406 and ribs 614, the cover 600 is able to transmit torque to sleeve 400. Sleeve 400 is able to then transfer torque to the main spring 300 because of the interference fit between main spring 300 and sleeve 400.

Generally, the inner surface 402 of spring sleeve 400 has a frictional coefficient such that the expansion force created by the expanding slip coils 312 generates a frictional force that prevents main spring 300 from sliding or turning within spring sleeve 400 during normal use. However, when overwinding occurs, the coils 312 shrink in diameter, the expansion force decreases, and the spring torque increases. Accordingly, the inner surface 402 has a desired diameter and friction coefficient such that the main spring 300 will slip within the inner surface 402 when a maximum amount of winding of main spring 300 has occurred (i.e., a predetermined amount of energy is stored in the spring and coil shrinkage has occurred), thereby preventing the overwinding of main spring 300.

The slip clutch has the added advantage of being able to function with a wide variety of main spring types regardless of their material or the amount of energy that they can store. Thus, the slip clutch will function satisfactorily with main springs that are manufactured at the extremes of specified production parameters.

Returning to FIG. 6A, two other parts mate when the cover 600 is mounted over the sleeve 400. The reduced diameter bent end portion 304 is designed to engage an extension 618. This relationship is important when there is relative rotation between the cover 600 / sleeve 400 assembly and the main spring 300. When there is relative rotation between the main spring 300 and the cover 600 the device includes a structure that generates a "clicking" sound to notify the operator that additional winding is no longer necessary. Specifically, main spring 300 has a bent end portion 304 that rests against a projecting portion 618 of cover 600. When the main spring 300 is being wound, the bent end portion 304 and the rotating spring sleeve and its projecting portion 618 rotate together. However, when the spring is being over-would by the operator, the bent end wire portion of the spring remains still due to the sliding of the spring 300 within spring sleeve 400 while projecting portion 618 continues to spin. As the two parts come into moving contact, a clicking sound is generated, this sound notifies the operator that the spring is wound to a predetermined maximum level.

The invention also includes a one way clutch and a wind indicator mechanism for indicating the amount of stored energy remaining in the main spring 300 and the approximate length of time remaining before the main spring 300 must be re-wound. The one way clutch and the wind indicator mechanism preferably include, as shown in FIG. 4, spring sleeve 400, spring sleeve grip 500, spring sleeve cover 600, back wind stop 700 and wind indicator 800. The invention also contemplates location this assembly within the first driven hanger 900.

Figure 7:
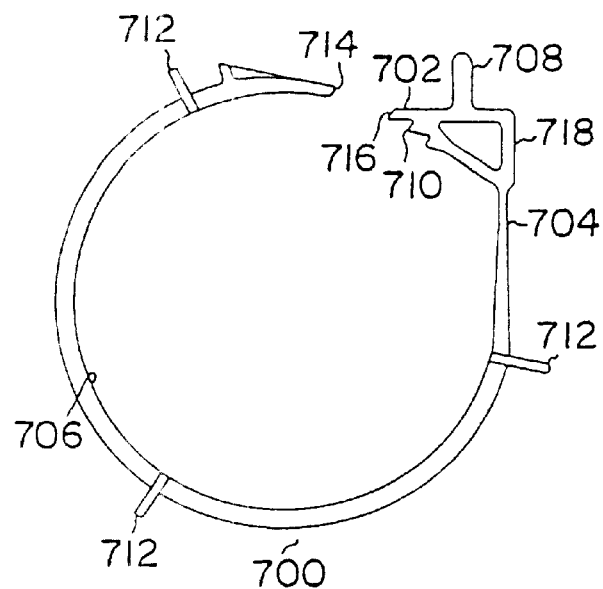
FIG. 7 is an axial view of the backwind stop.

As shown generally in FIG. 4, the back wind stop 700 is mounted within indicator 800. Back wind stop 700 acts as an interface between the indicator 800 and the cover 600. The back wind stop 700 can be seen in greater detail in FIG. 7.

Figure 8:
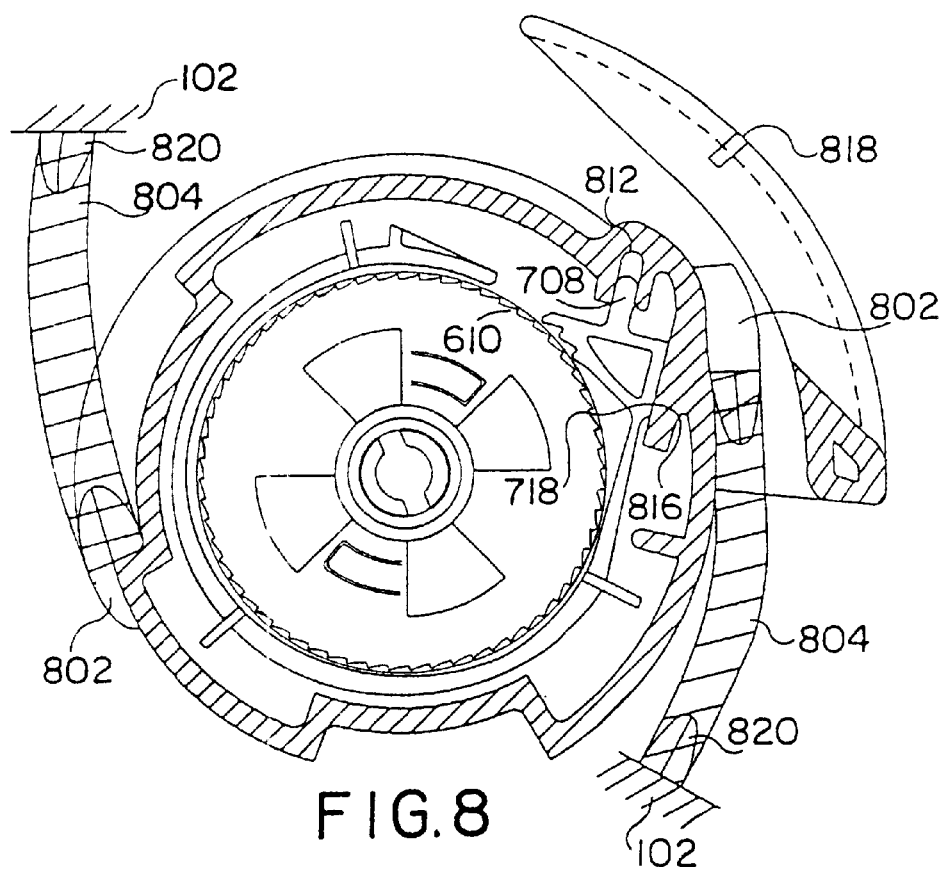
FIG. 8 is an axial view of the indicator mechanism.

The back wind stop 700 nests within the indicator 800 as shown in FIG. 8. Returning to FIG. 7, backwind stop 700 is preferably a "C" shaped structure, in other words, it is any shape that is less than a full circle, that is flexible such that the space between the ends 714 and 716 of the back wind stop 700 can be flexed together, thereby reducing the overall diameter of the back wind stop 700. Backwind stop 700 has an engaging portion 702, a straight portion 704, and a clamping portion 706. In addition, backwind stop 700 includes a projection 708 which extends radially from the outer surface, and an abutting face 718 located opposite teeth 710, which preferably point in the same direction. Back wind stop 700 may also include additional projecting portions 712 which are present for manufacturing reasons.

FIG. 8 shows the back wind stop 700 in its assembled position with respect to the indicator 800 and the cover 600. First, the relationship between the back wind stop 700 and the indicator 800 will be discussed, then the relationship between the back wind stop 700 and the cover 600 will be discussed.

Back wind stop 700 mounts inside, or radially inward, of indicator 800. The back wind stop 700 is positioned within the indicator 800 in an orientation that allows projection 708 to engage a corresponding recess 812 in indicator 800. Indicator 800 also has several spacing lands 814 to assist in properly locating the back wind stop 700 within the indicator 800. The indicator has a shoulder 816 that works in cooperation with abutting face 718.

Spring sleeve cover 600 fits inside back wind stop 700. The overall inner diameter of the back wind stop 700 is slightly less than the outer diameter of the cover 600. So the cover 600 experiences a very slight interference fit with the back wind stop 700. This interference fit is so slight that it transfers only a minimal torsional load between the two members, but merely serves to insure that the back wind stop 700 bears snugly around the cover 600.

The teeth 710 of the back wind stop 700 each point in the same direction. These teeth 710 cooperate with teeth 610 to provide a one way clutch. In other words, the teeth 710 and 610 are designed in a way which allows easy rotation in one direction, but will intermesh and prevent rotation in the opposite direction.

In the preferred embodiment, when main spring 300 is being wound the cover 600 rotates freely within back wind stop 700 because the straight portion 704 flexes and allows teeth 710 to float radially outward, lifting the back wind stop teeth 710 clear of the spring sleeve cover teeth 610. The respective teeth preferably do not contact (or only slightly contact), during winding so that the device winding so that the device can be wound silently.

After winding has been completed, the torsional energy stored in main spring, 300 will be released and the main spring 300 will tend to bias the cover 600 and its associated teeth 610 in the opposite rotational direction. This causes the teeth 710 of the back wind stop 700 to immediately engage the cover teeth 610, thus causing the two members to lock up. When this lock up occurs, the back wind stop constricts cover 600 and urges the cover 600 in tighter engagement with the back wind stop 700. This, in turn, further forces teeth 610 and 710 tighter together.

In the locked position, the cover 600 and back wind stop 700 rotate together in the direction of spring bias of the main spring 300 (counter clockwise in FIG. 8). Shoulder 816 on the indicator 800 cooperates with abutting face 718 on the back wind stop 70 to prevent rotation of the back wind stop 700 within the indicator 800. This arrangement also allows the indicator 800 to lock with cover 600 via the back wind stop 700. In other words, when cover 600 experiences the torsional spring bias of main spring 300, all three elements: the cover 600, the back wind stop 700 and the indicator 800 lock together and rotate as one unit.

The indicator 800 also has spring holders 802. The preferred embodiment contemplates the use of two, but any number would suffice. These spring holders 802 each hold a proportioning spring 804 and a curved valley 806 guides the spring around the circumferential outer surface of the indicator. The preferred embodiment also contemplates the use of complementary guides (not shown) disposed on the inner surface of the housing 102. The other end of the proportioning spring 804 is attached to the housing 102 by a similar type of spring holder 820.

The indicator 800 generally operates by displaying or indicating to a user an approximate lever of torsional spring energy remaining in the main spring 300. As the main spring 300 biases cover 600 in the unwind (counter clockwise direction in FIG. 8) direction, the cover 600, back wind stop 700 and indicator 800 will tend to rotate in the direction of unwind of the main spring 300. This torsional force is counter-balanced by proportioning springs 804, which exert a torsional force in the opposite direction (i.e. a torsional Force which tend to wind the main spring 300, clockwise in FIG. 8). Thus, indicator is held in a state which balances the rotational forces of the main spring 300 with the proportioning springs 804. The more energy the main spring 300 has, the more indicator 800 will tend to rotate against proportioning springs 804 and vice versa.

Another expression of the concept of counter-balancing spring forces is that the proportioning springs 804 convert the level of spring energy in the main spring 300 to an angular displacement which can be used to display the amount energy currently contained by the spring. The preferred embodiment of this concept displays an angular displacement to a user using a label surface 808. The label surface 808 contains a mark or indicia 818 which can be viewed by a user through slot 122 (see FIG. 1). In the preferred embodiment, label surface 808 is located on a banana shaped structure that is mounted to the exterior surface of indicator 800. The relative position of the indicator 800, as shown by the mark or indicia 818 of the label surface 808, reveals to the operator the approximate amount of energy, in relative terms, stored in the main spring 300. Thus, when there is no energy stored in the main spring 300, indicia 818 will be at a first position as determined by the two proportioning sprints 804. As a maximum torque is applied to main spring 300, that torque will push against the proportioning springs 804 and alter the rotational position of the indica 818 to a second position.

The spring constant of the bias springs 804 is chosen to preferably match the range of torque that the main spring 300 can exert. Because the indicator 800 operates based swing, and the indicator 800 will still function properly. This is true even if the various springs have varying numbers of coils or different material properties.

The wind indicator mechanism has the added advantage of being functional even if the main spring deforms slightly or changes shape over time because the present system measures relative torsional forces rather than counting the number of times the spring has been wound by the operator.

Figure 9A:
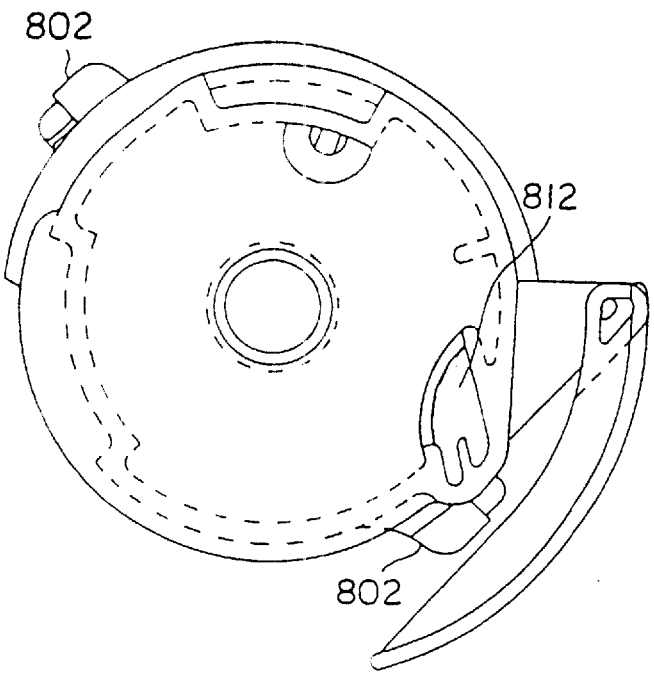
FIG. 9A is an outside axial view of the indicator.
Figure 9B:
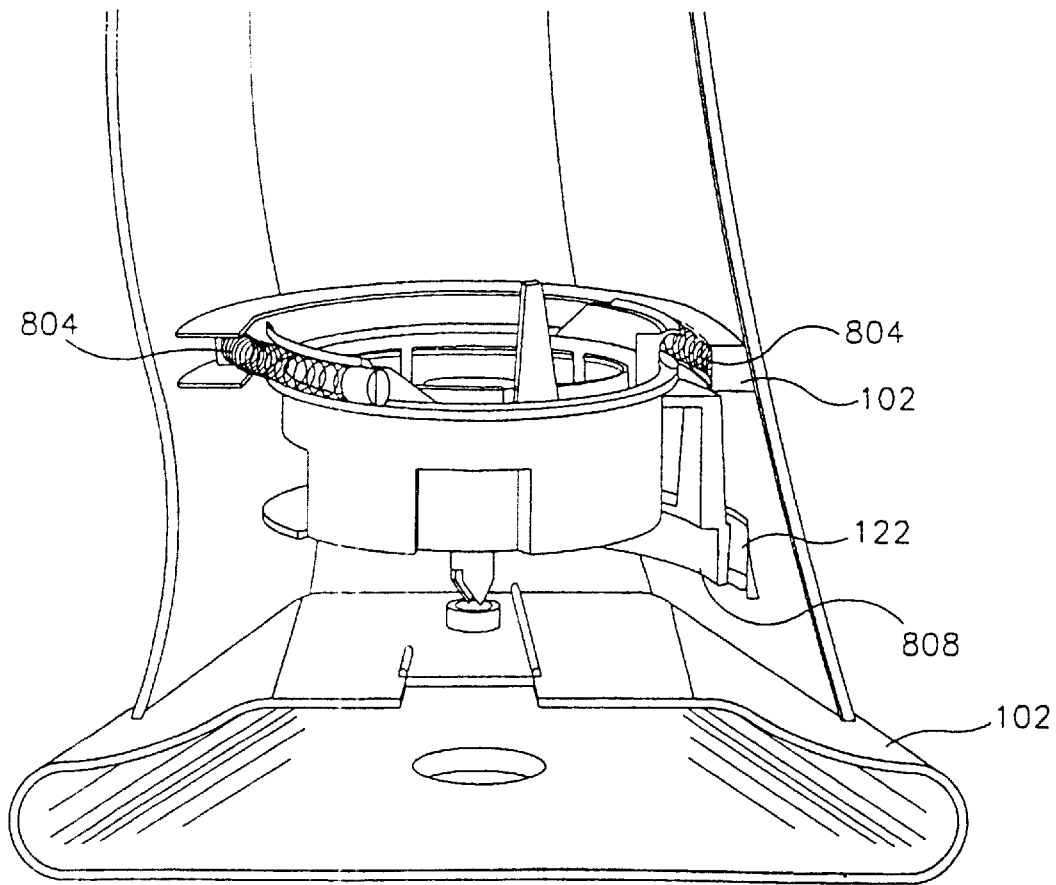
FIG. 9B is a view of the indicator installed into the housing.

FIG. 9A shows a side view of the indicator 800. This Figure more accurately portrays the relative locations of the preferred spring holders 802. FIG. 9B shows the indicator 800 installed into the housing 102. FIG. 9B also shows the relationship between the label surface 808 and slot 122.

Returning to FIG. 2B the escapement end 204 of the swing will now be discussed. The preferred embodiment of the invention contemplates the use of swing height adjusting mechanism. This invention can best be understood when compared to an escapement device without the height adjustment feature.

The escapement device of the present invention preferably allows s the gradual and intermittent release of spring energy into the swinging motion of a child sitting on the seat. This gradual release of energy allows the spring motor to last longer because the spring motor does not necessarily drive the seat on every oscillation. Rather the spring motor is maintaining the swinging motion of the child by contribution small increments of rotational energy to the swing at preferred, strategic times.

Because the escapement device controls the power output of the main spring 300 to the swing, the escapement device operates the driving arm 1000 (as opposed to the driven arm 900). FIG. 18 shows the preferred major components on the escapement end 204 (FIG. 2B) of the swing.

FIG. 10 shows the driving arm 1000, a dog 1100 that clips into a groove 1002 of the circular portion 1004 of the driving arm 1000, amounting bracket 1200, a height adjuster 1500, a control member 1600, a rocker arm 1700 and a gear 1400. The main spring 300 is rigidly mounted to gear 1400. The parts are shown in the order of assembly.

Figure 11A:
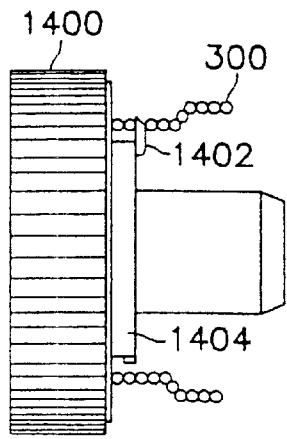
FIGS. 11A–B are side and front views of an assembly schematic view of the gear and main spring.
Figure 11B:
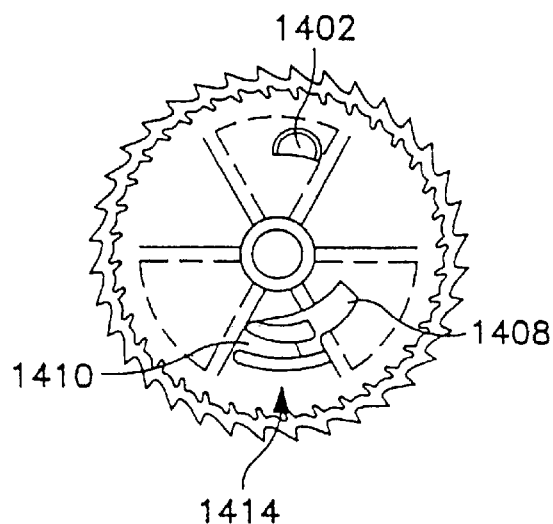
Figure 11C:
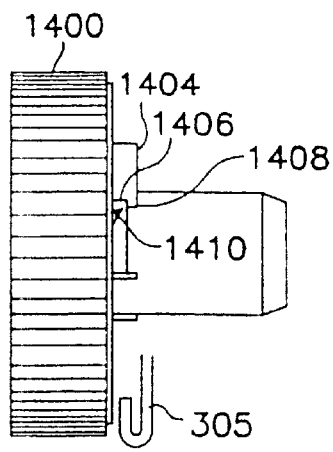
FIG. 11C is a side view of an assembly schematic view of the gear and main spring just prior to final installation.
Figure 11D:
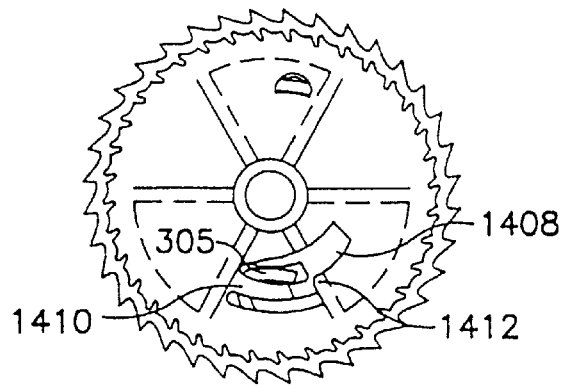
FIG. 11D is an enlarged view of FIG. 11B.

The main spring 300 (see FIG. 3) is attached to gear 1400 at the end shown in FIG. 3B. FIGS. 11A–11D shows the details of this assembly. FIG. 11A shows a side view of gear 1400 and main spring 300. Gear 1400 has a holder 1402 that radially extends from an extension boss 1404 and holds several coils of main spring 300. On the opposite side of the boss 1404, a clip retainer assembly 1414 holds the curved end 305 of main spring 300,the clip retainer 1414 (best shown in FIG. 11C, a bottom view of gear 1400) includes a recess 1406 and a resilient clip 1410. The bottom of recess 1406 includes a land 1408. FIG. 11D is an enlarged view of the clip retainer 1414.

As the gear 1400 and the main spring 300 rotate with respect to one another, the curved end 305 of the main spring 300 will deform clip 1410 towards gear 1400. The curved end 305 will eventually snap over clip 1410 and nest in recess 1406. Land 1408 will insure that the curved end 305 does not escape axially, and the clip 1410, working in conjunction with shoulder 1412, will insure that the curved end 305 will not escape circumferentially.

Preferably, the main spring 300 is biased so that the curved end 305 will generally press against shoulder 1412. In other words, with respect to FIG. 11D, the spring preferably urges clockwise rotation of gear 1400. In that way, shoulder 1412 experiences the vast majority of rotational force exerted by the main spring 300 to gear 1400 and the clip 1410 insures that the curved end 305 does not escape.

Returning to FIG. 10, the exploded view of the escapement end 204 (see FIG. 2B), the mounting bracket 1200 helps to mount the escapement assembly to the frame. Generally, all of the parts shown in FIG. 10 are suspended by shaft 210 (see FIG. 2B). The mounting bracket 1200 keeps the components axially fixed along shaft 210.

The mounting bracket 1200 has a tongue 1202 slides into groove 220 which is rigidly secured to the housing 102 (not shown in FIG. 18). The mounting bracket 1200 is the only element that is rigidly fixed to the housing in terms of rotation, All of the other elements are fixed by the shaft 210 (see FIG. 2B) to the housing but can rotate relative to the housing.

The escapement mechanism is assembled by axially stacking the components shown in FIG. 10 in the order shown in the figure. All of the components have a central aperture which allows coaxial assembly either to the shaft 210 or to a cylindrical extension of an adjacent member. After the dog 1100 has been clipped to the driving hanger 1000, in the manner discussed above, the preferred embodiment also includes the driving hanger 1000 having a stepped central shaft 1006 with a lower larger diameter portion and an upper smaller diameter portion.

Figure 12A:
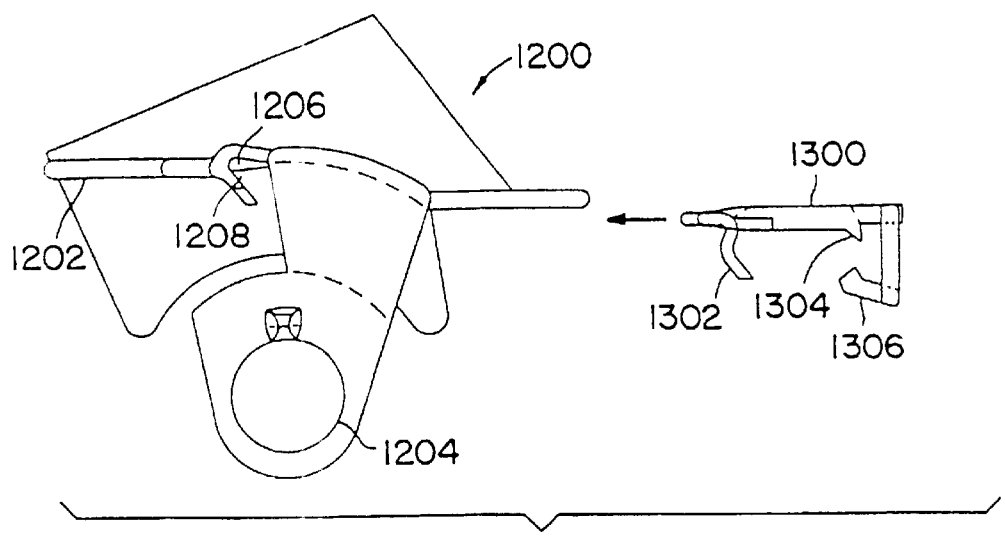
FIGS. 12A–C are side, front and top views of a mounting bracket and a pawl.
Figure 12B:
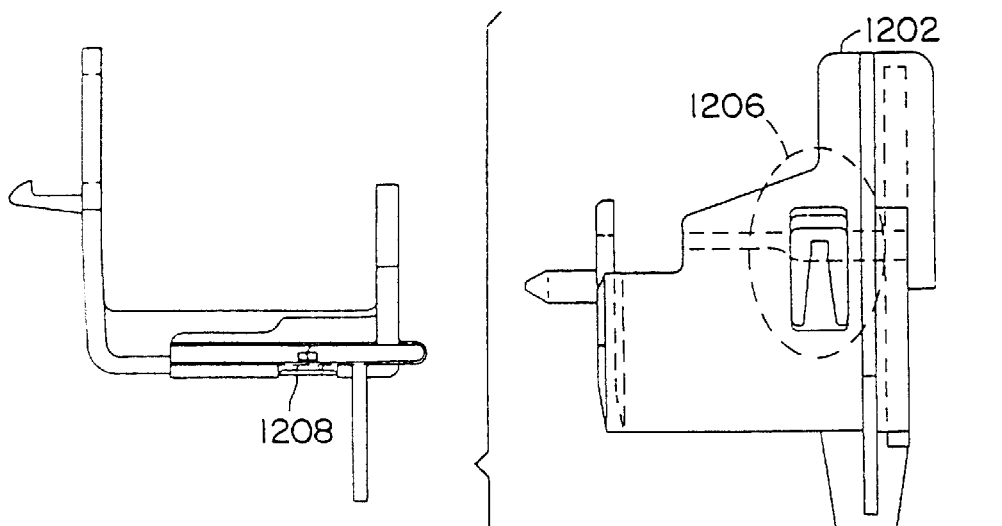
Figure 12C:
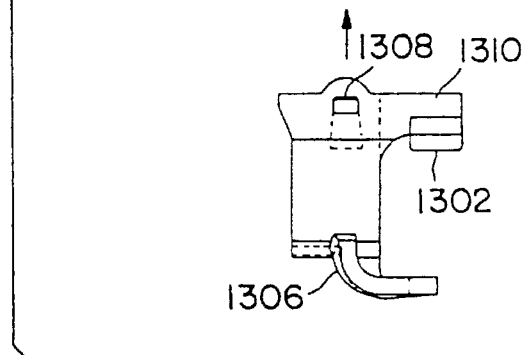

The next step in the assembly process is to clip the pawl 1300 onto the mounting bracket 1200. FIGS. 12A–12C show this assembly process. The mounting bracket 1200 has a recess 1208 with a bayonet latch 1206 (see FIG. 12C). Pawl 1300 has a latch aperture 1308 that cooperates with the bayonet latch 1206. The recess 1208 is semi-circular (see FIG. 12A) and the leading edge 1310 of the pawl 1300 snaps into the recess. The recess is also wide enough (see FIG. 12B) to accommodate the entire leading edge 1310 of the pawl 1300. This mounting arrangement provides a stable mount for the pawl 1300, allows the pawl 1300 to pivot within a predetermined angular range, and allows easy installation of the pawl 1300.

Returning to FIG. 10, after the pawl 1300 has been installed into the mounting bracket 1200, the mounting bracket 1200 has an aperture 1204 which fits radially over the larger lower portion of the stepped central shaft 1006. The height adjuster 1500 has a central aperture 1502 and a central boss 1504. The central aperture 1502 slides over the larger lower diameter portion of the central shaft 1006, the central boss 1504 on the height adjuster 1500 is used to receive the aperture 2602 on cam control member 2600. The height adjuster also has a finger actuator 1506 which extends out of slot 120 (see FIG. 1). This finger actuator is used by an operator to adjust the swing arc of the swing. Although the discussion and FIG. 10 show the cam control member 2600 being assembled, the assembly process would be the same for the other control member 1600 (see FIG. 17A and associated discussion) and its associated height adjuster 1500.

The rocker arm 1700 mounts on the upper smaller diameter portion of the central aperture 1502 via a cylindrical tube 1710. The step prevents the rocker arm 1700 from moving further towards the cam control member 2600. The cylindrical tube 1710 of the rocker arm 1700 also allows the rocker arm 1700 to receive the narrow mounting tube 1460 of gear 1400. In essence, the cylindrical tube 1710 of the rocker arm 1700 bridges over the narrow mounting tube 1460 of gear 1400 and the upper smaller diameter portion of the central shaft 1002. The narrow mounting tube 1460 and the upper smaller diameter portion of the central shaft 1002 have the same diameter and contact each other within the cylindrical tube 1710. When the device is completely assembled, only the driving hanger 1000 and gear 1400 contact the shaft 210 (not shown in FIG. 18). All of the rest of the components are mounted radially outward of the shaft 210 (not shown in FIG. 18). All of the rest of the components are mounted radially outward of the shaft 210 (not shown in FIG. 18). All of the rest of the components are mounted radially outward of the shaft 210 (not shown in FIG. 18).

Figure 13:
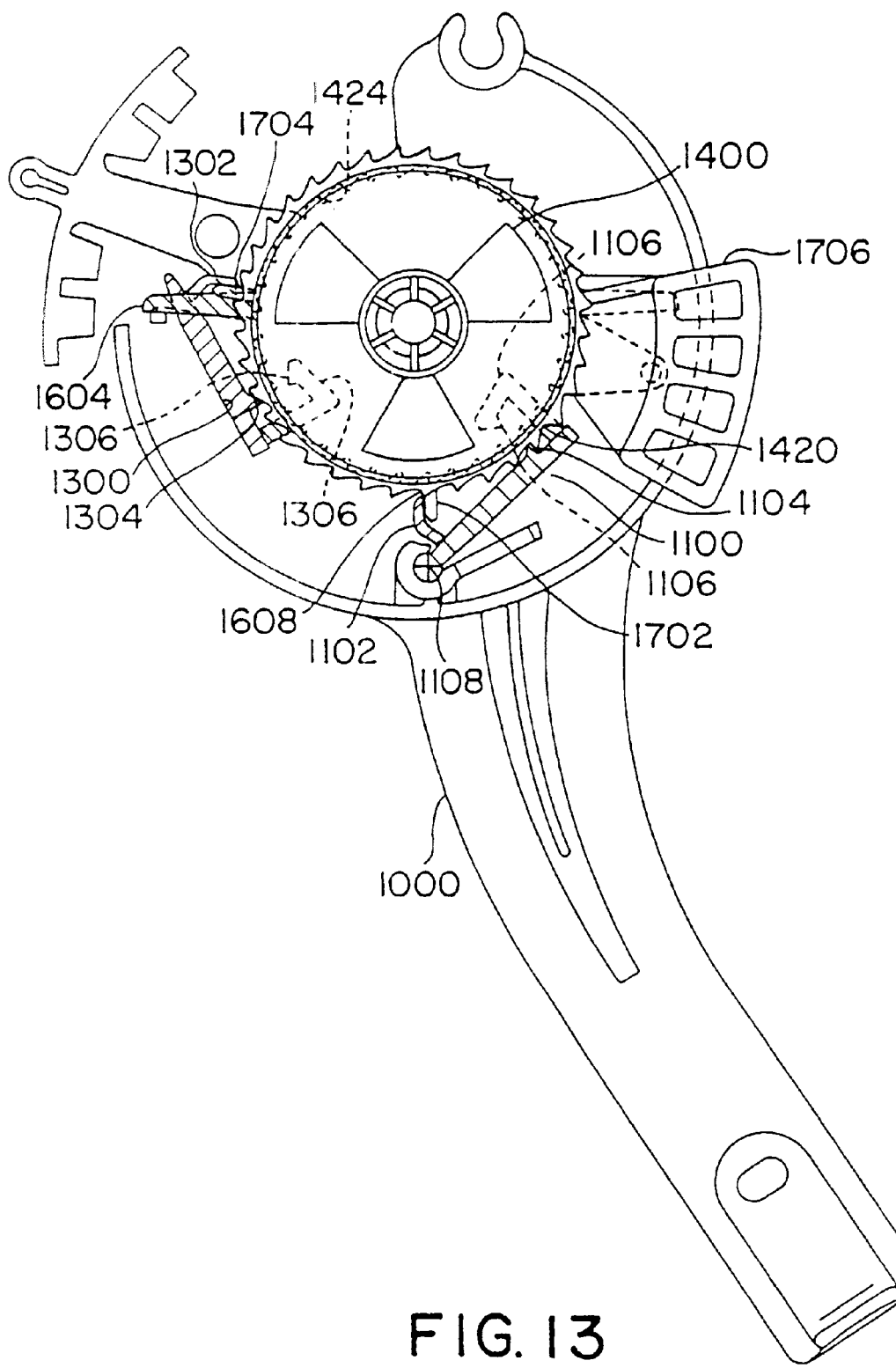
FIG. 13 is a cross-sectional view of the assembled escapement.

FIG. 13 shows the device after it has been fully assembled. This is a view of the assembly from the main spring 300 looking out towards the escapement. The basic geometric relationships can be gleaned from the figure. In addition to the apparent angular relationships, the device also operates on two different axial planes. The height adjuster 1500 and the control mechanism 1600 operate in a plane rearward of gear 1400. The fingers 1102 and 1302 also operate on this axially rearward plane. The gear 1400 generally operates in a plane located axially rearward plane. The gear 1400 generally operates in a plane located axially inward (towards the center of the swing) of the control mechanism plane. Chisels 1104 and 1304 operate in the same plane as gear 1400.

Figure 14D:
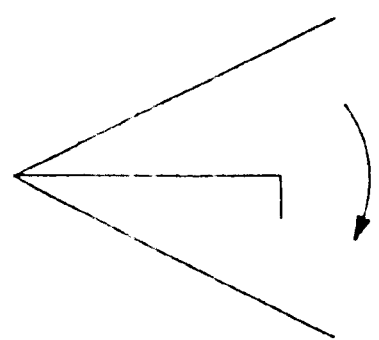
FIGS. 14A–D are operational schematic views of a swing in a forward position, bottom dead center position, rearward position, and forward position.
Figure 14C:
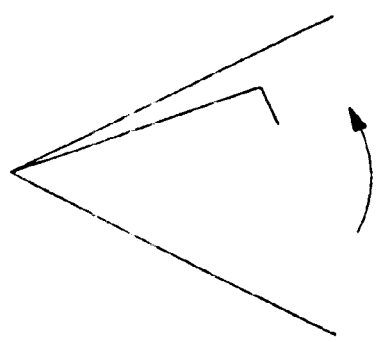
Figure 14B:
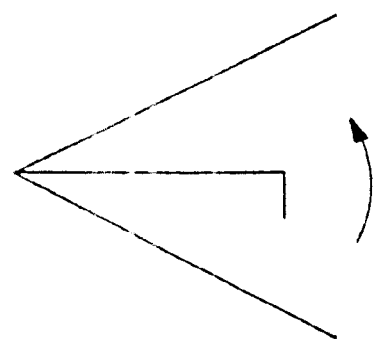
Figure 14A:
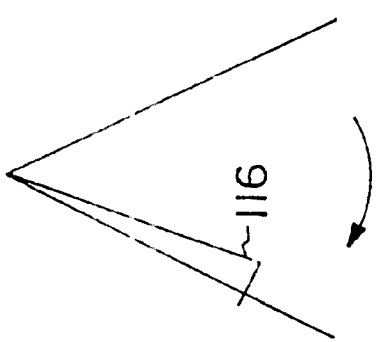

An overview of the swinging motion in accordance with the broad features of the invention is shown in FIGS. 14A–14D. FIG. 14A shows the swing seat 116 near its extreme forward position. At this position, the seat 116 is just beginning to stop and move rearwards in a descent. FIG. 14B shows the swing at bottom dead center. Here the swing has the greatest velocity and no potential energy. At this point the swing is just beginning to move vertically upwards or ascend. FIG. 14D shows the seat 116 near its absolute maximum rearward position. After the swing reaches the absolute maximum rearward position, the swing will then begin to descend towards bottom dead center.

The preferred embodiment applies to the torsion energy contained in the main spring 300 during one of its forward swinging descents towards bottom dead center. In other words, the invention contemplates the application of the main spring's 300 torsion energy in the same direction as the motion of the seat 116. The invention also contemplates the use of an escapement mechanism to carry out this intermittent application of power from the main spring 300 to the seat 116.

In accordance with the invention, FIG. 14 generally shows a preferred conceptual diagram of the selective, time-varying interconnection between the swing and the main spring. For example, FIG. 14A shows the position of the seat 116 when the user has pulled the swing forward. In this forward position, the swing freewheels (i.e. the swing is not attached to the spring). As the seat 116 is released, the seat 116 begins to travel rearwards. Eventually, the seat will reach the position shown in FIG. 14B. In this position the swing engages and connects to the main spring and begins its rearward ascent as shown in FIG. 14C. The main spring is biased in a forward direction, in other words, the spring, when engaged to the swinlg, tends to move the swing in the forward direction.

As the swing continues rearward, the momentum of the swing counterwinds (i.e. tightens) the spring until the swing apex is reached. It is during this time, when the seat is in a rearward position but traveling in a forward direction, that the main spring releases torsional energy into the swing. As this swing passes the bottom the swing arc, the main spring disengages form the swing. The swing then begins to freewheels and will repeat this cycle. It should be appreciated that the disengagement point on the forward swing will preferably occur after the swing passes the engagement point on the forward swing. This, in etffect, allows the spring to unwind and transfer energy to the swing.

The preferred embodiment of the escapement device is shown in FIGS. 15A–15D. Turning to those figures, four elements provide this gradual and intermittent release of spring energy. A pawl 130) which includes a pawl finger 1302, a pawl chisel 1304 and a pawl safety 1306 are disposed near the circumference of a gear 1400.

A dog 1100 which includes a dog finger 1102, a dog chisel 1104 and a dog safety 1106, is located at a different circumferential location form the pawl 1300. The dog 1100 is also located near the circumference of the gear 1400 similar to the pawl 1300. The dog 1100 is mounted to the driving hanger 100. The driving hanger 1000 rotates with the driving hanger 1000 as the driving hanger rotates. Dog 1100 orbits about the gear 1400 and remains a fixed radial distance from the axis of rotation of the gear 1400.

The preferred embodiment includes a safety device which prevents the main spring 300 from rapidly unwinding. In the past, motor springs of this type would occasionally run away, or rapidly unwind. This condition generally occurred because one of the chisels (either 1304 or 1104) failed to properly engage gear 1400. When prior art springs were free from any rotational support they would unwind so rapidly that the chisels 1104 or 1304 would float and could not engage the rapidly unwinding spring.

The preferred embodiment, best seen in FIG. 13, includes a device which prevents this condition (floating) by forcing chisels back into engagement with the exterior teeth 1420 of gear 1400. Both the pawl 1300 and the dog 1100 have safety catches 1306 and 1106 respectively. These safety catches are disposed radially inward and opposite chisels 1104 and 1304. When an unintended rapid unwind condition occurs, the safety catches 1106 and 1306 bounce off interior gear teeth 1424. This bounce causes the pawl 1300 and the dog 1100 to violently jerk radially inward about their respective pivots. This jerk forces either chisel 1104 or chisel 1304 into engagement with the exterior gear teeth 1420 and prevents further unintended unwinding of the main spring 300.

Returning to FIGS. 15A–15D), a rocker arm 1700 includes an upper arm 1704, a lower arm 1702 and a counter weight 1706. The rocker arm is disposed in a manner which allows the upper arm 1704 to touch the pawl finger 1302 of the pawl 1300 and allows the lower arm 1702 to touch the dog finger 1102 of the dog 1100.

The operation of the escapement mechanism will now be described. Recall that the pawl 1300, does not move and is rigidly attached to ground or housing 102. See FIG. 13. Recall that the dog 1100 is rigidly mounted to the second hanger 1000 and orbits about gear 1400 in an arc that roughly corresponds to the swinging of the child. In other words, the fulcrum 1108 (or pivot point about which the dog pivots) moves in a circumferential arc that corresponds to the arc described by the lower arm 1002 and the swinging motion of the child (see FIG. 13). The rocker arm 1700 is biased in a clockwise direction by counter weight 1706. Finally, gear 1400 is fixed to the main spring 300 which biases the gear 1400 in a clockwise direction.

Given these basic physical relationships, this discussion will describe one power stroke or increment advancement of the escapement mechanism. In other words, this discussion will describe the workings of the escapement mechanism as the child swinigs from an extreme forward position (a position near FIG. 14A) to an extreme rearward position (a position near FIG. 14C) to an extreme forward position (a position near FIG. 14A) and back to a rear ward position (a position near FIG. 14C).

I. Start: The Child is at a Forward Position.

Figure 15A:
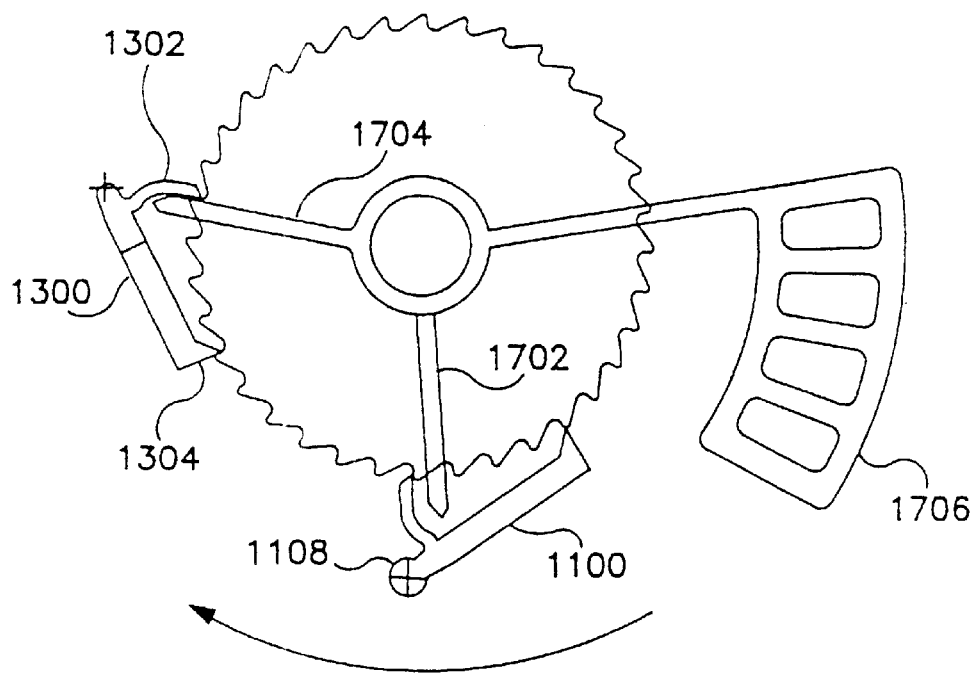
FIGS. 15A–D are operational schematic views of an escapement assembly moving in a forward direction, rearward direction and showing a dog engaging a gear, rearward direction, forward direction and showing a pawl engaging a gear.

This position is shown in FIG. 14A and 15A. At this forward position the dog 1100, rigidly related tot he driving hanger 1000, is not connected to the gear 1400 or the rocker arm 1700. The counter weight 1706 of the rocker arm 1700 holds the pawl 1300 engaged to gear 1400. As seen in FIG. 15A, the upper arm 1704 of rocker arm 1700 contacts the pawl finger 1302 and pivots the pawl 1304 of the pawl 1300 into engagement with a specific gear tooth 1410. The pawl 1300 prevents rotation of gear 1400. In comparing FIGS. 14A and 15A, it should be noted that FIG. 14A shows the swing, drawn much further forward than FIG. 15A for clarity. The seat will swing forward, come to an extreme forward position, and begin to travel rearwards.

II. The Dog Engages the Gear as the Swing is Near Bottom Dead Center.

Figure 15B:
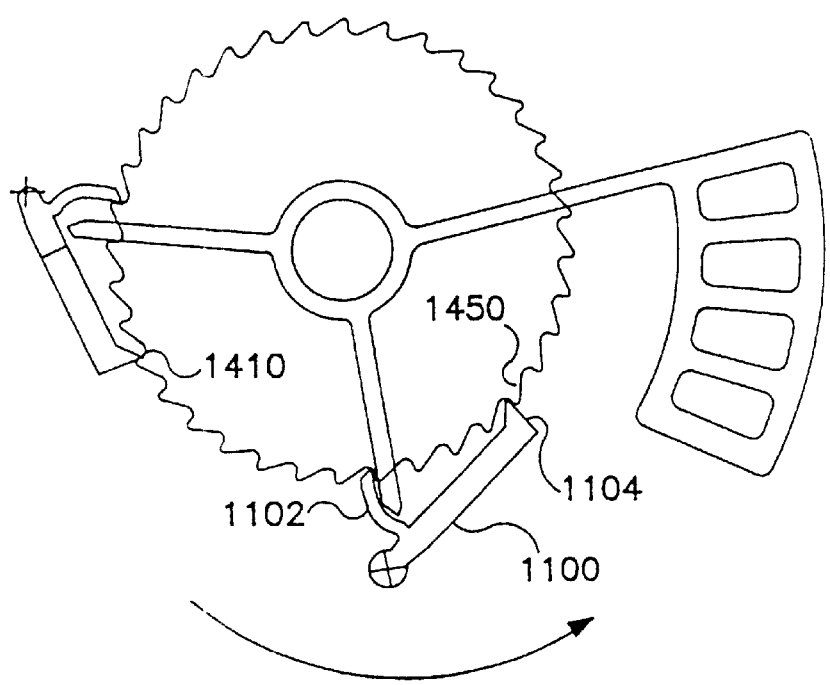

Referring to FIGS. 14B and 15B, this is about the position that the dog 1100 engages gear 1400. As the seat travels rearwards, the dog 1100 will orbit gear 1400 in a counter clockwise direction. Eventually, the dog finger 1102 of the dog 1100 will contact the lower arm 1702 of the rocker arm 1700. This will cause the dog 1100 to pivot towards gear 1400 and the dog chisel 1104 will engage gear 1400. The dog 1100 is only connected or engaged to the gear 1400 after the lower arm 1702 of the rocker arm 1700 pivots the dog chisel 1104 of the dog 1100 onto the gear 1400. The momentum of the seat causes the dog finger 1102 to pivot the dog 1100. The point at which the dog 1100 engages gear 1400 is called the engagement point.

III. The Swing Begins to Travel Rearwards Against the Torsion Force of the Motor Spring.

Figure 15C:
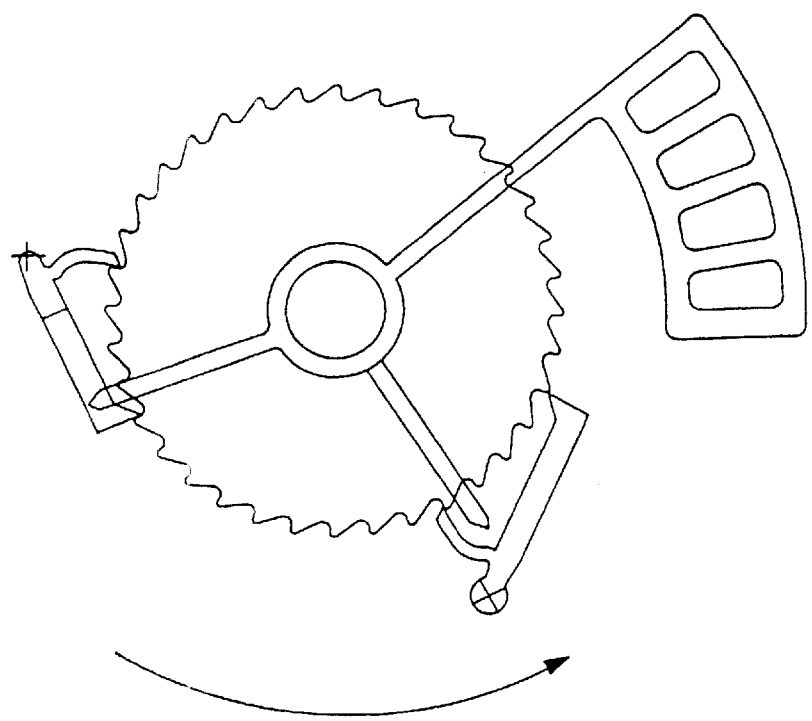

FIGS. 14C and 15C show the mechanism after the dog has been engaged to the gear 1400 and about the time the pawl 1300 releases the gear 1400. After the dog 1100 is engaged to the gear 1400, the dog finger 1102 drags the lower arm 1702 opposite of the rocker arm 1700. At this time, where the lower dog 1100 is engaged to gear 1400, the seat 116, the lower dog 1100, the gear 1400 and the rocker arm 1700 all move together in unity. Again, it should be noted that the FIG. 14C and 15C are drawn in exaggerated positions for clarity.

Remembering that the rocker arm 1700 is now rotating with gear 1400, the upper arm 1704 of the rocker arm 1700 scrapes along the inside of the pawl 1300 and pivots the pawl chisel 1304 of the pawl 1300 out of engagement with the gear 1400. At this time, with the pawl chisel 1304 is out of engagement with the gear 1400, the dog chisel 1104 on the dog 1100 is the member which primarily keeps the spring motor 300 from rotating.

As the momentum of the seat 116 continues to move the related components rearward, the system starts to move against the torsion force of the motor spring 300. Eventually, the torsion force of the motor spring 300 will overcome the momentum of the seat 1116, and the seat 116 will reach its rearward apex and begin to move forward. The power of the spring, along with the release of gravitational potential energy of the seat, drives the seat forward.

IV. The System Travels Forward and the Pawl Chisel Advances One Tooth.

Figure 15D:
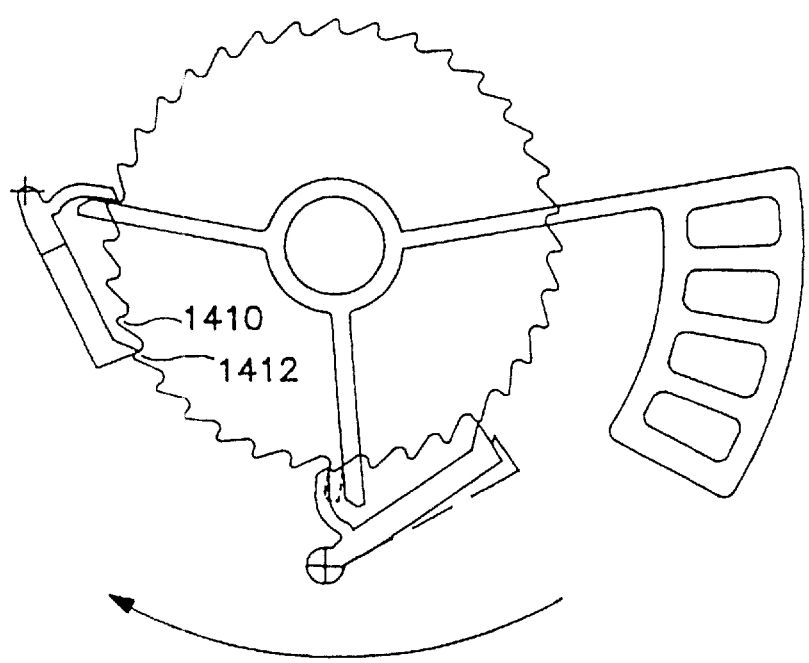

FIG. 14D and 15D show the mechanism as the system is moving forward and as the pawl 1300 advances one tooth as it engages the gear 1400. When the system is in the rearward position, but traveling forward, the rocker arm 1700 is held against the dog finger 1102 by the gravitational biasing force of the counter weight 1706. During rearward motion, in contrast, the rocker arm 1700 is fixed by the momentum of the seat and the dog finger 1100. As the seat 116 continues to move forward, the upper arm 1704 of the rocker arm 1700 will eventually hit the pawl finger 1302 of the pawl 1300. This will pivot the pawl chisel 1304 of the pawl 1300 into engagement with the gear 1400. Specifically, as the pawl chisel engages gear 1400, the pawl chisel 1304 will advance one tooth and engage tooth 1412.

The advancement of the dog chisels 1104 and 1304 about the circumference to the gear 1400 is accomplished by carefully designing the rocker arm 1700 and the relative positions of dog 1100 and pawl 1300. The rocker arm 1700 is designed in a way that the angle between the upper arm 1704 and the lower arm 1702, advances the dog 1100 and pawl 1300 one tooth when there is a "hand off" from one finger to the other finger. This "hand off" concept will be explained in greater detail.

Generally, there are two important structural relationships in the mechanism. First, the rocker arm 1700 must always rest on one of the fingers: either the pawl ringer 1302 or the dog finger 1102. Second, the gear 1400, which is torsionally sprint biased in a clockwise direction, must always be supported (or prevented from rotating) by one of the chisels 1304 or 1104. The intermittent advancement of gear 1400 is based on these two fundamental structural relationships: the necessity that the rocker arm 1700 engages one pawl, it simultaneously disengages the other pawl. Given that one of the fingers supports the rocker arm, a hand off is when there is a change in which finger supports the rocker arm. From the discussion above, an important consequence of this hand off is that the new finger which supports the rocker arm also becomes the pawl which supports the gear. Restated again we can conclude that the dog which is supporting the rocker arm is also the dog which is supporting the gear at that time.

Returning to physical structure of the preferred embodiment, every time there is a change in which finger supports the rocker arm (i.e., a hand off), the mechanism is deigned so that the newly engaged pawl will engage the gear 1400 one half (½) of a tooth forward, in the clockwise direction (the motor spring 300 biased direction). In the preferred embodiment the hand off work like this:

(1) As the swing is swinging forward, the pawl 1300 is supporting the gear 1400 and the dog 1100 free wheels forward. This is shown in FIG. 15A.

(2) As the swing moves rearward from a forward location, the dog 1100 will engage the lower arm 1702 of the rocker arm 1700 and the pawl 1300 will be released. A hand off has just occurred, and the mechanism advances ½ a tooth in the spring biased direction (clockwise in FIGS. 15A–15D). This hand off is shown in FIG. 15B.

(3) As the swing moves forward from a rearward location, the upper arm 1704 of the rocker arm 1700 will contact the pawl finger 1302 of the pawl 1300, this will cause the pawl 1300 to pivot towards gear 1400 and the pawl chisel 1304 will engage gear 1400. At this point, the dog 1100 will pivot away from gear 1400 and the dog chisel 1104 will disengage from gear 1400. This is shown in FIG. 15D. Another hand off has occurred and the gear 1400 has advanced ½ a tooth.

If the two hand off at step (2) and step (3) above are added together we get: ½ a tooth+½ a tooth=1 tooth. In other words, two hand off allows the gear 1400 to advance one tooth. In each swing cycle or period of motion (maximum forward position to maximum rearward position back to the maximum forward position) there are two hand off as discussed in steps (1) through (3) above. So the relationship between swing cycles or periods and gear advancement is 1:1. In this embodiment the mechanism advances the gear one tooth every swing cycle or period.

Another feature of the preferred embodiment is to allow height adjustment. The preferred embodiment includes a height adjusting feature that can regulate the maximum height of the seat as it swings back and forth. The invention also allows the user to change the maximum seat swing height during operation of the swing.

A control member works in conjunction with the escapement mechanism discussed above. Basically, the control member prevents the motor spring 300 from imparting rotational energy to the seat 116 of the swing unless the seat is oscillating at an amplitude less than a pre-set desired maximum. In other words, if the swing is swinging above a preset maximum, the control member will prevent the spring form imparting rotational energy to the swing. The control member does this by interrupting the normal operation of the escapement mechanism discussed above.

A preferred embodiment of the invention is shown in FIG. 16A–16F. The height adjustment mechanism adds several additional elements to the escapement assembly discussed above. A control member 1600 with an oval aperture 1602 is mounted on a height adjuster 1500 (not shown in FIGS. 16A–16F), as discussed above. The control member 1600 has two arms, a first arm 1604 and a second arm 1606. The control member also has a triangle 1608. The height adjuster also has a movable stop 1508. Referring back to FIG 10, when the user pivots the height adjuster 1500 with the finger actuator 1506, then that will change the angular position of the adjustable stop 1508.

Figure 16A:
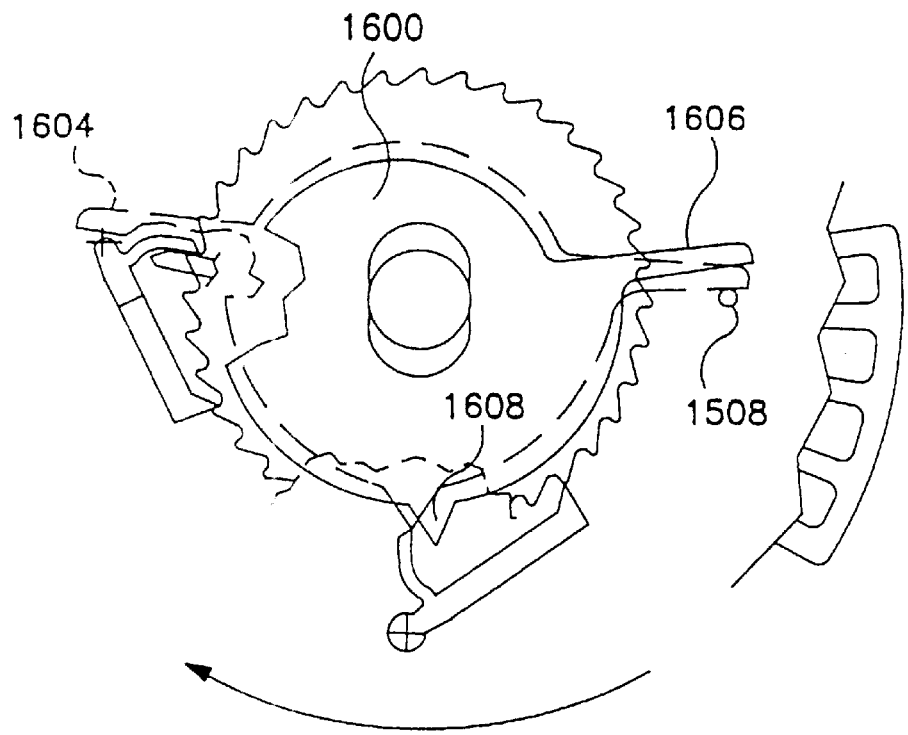
FIGS. 16A–F are operational schematic views of a modified escapement assembly moving in a forward direction, moving in a rearward direction and showing a dog being pivoted by a control member and engaging a gear, moving in a rearward direction, moving in a forward direction and showing a pawl engaging a gear, moving in a forward direction, and moving in a rearward direction and showing a dog being pivoted by a rocker arm and engaging a gear.
Figure 16B:
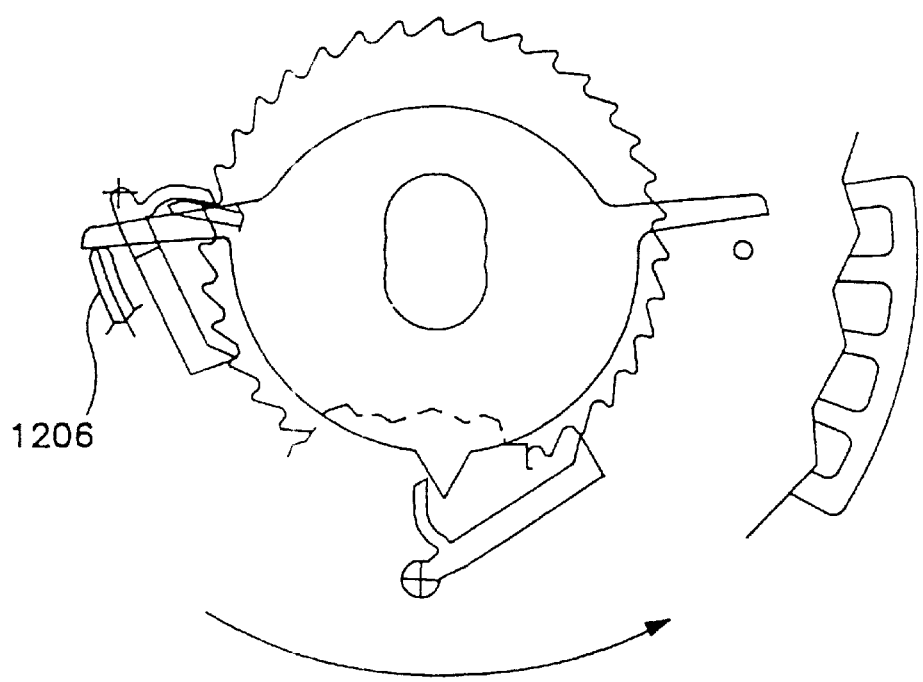

Retutring to FIGS. 16A–16F, the first arm 1604 of the control member 1600 contacts a fixed stop 1206 (see FIG. 16B). Preferably, this fixed stop 1206 is a shoulder of the mounting bracket 1200. The second arm 1606 of the control member 1600 contacts the adjustable stop 1508. Now the operation of the device will now be described.

Generally, if the seat 116 of the swing is swinging higher than a preselected maximum height, the control member 1600 forces the dog 1100 to engage the gear 1400 at the same tooth it last left gear 1400. In other words, if during the last cycle of the swing, the dot 1100 left tooth 1450, the control member would force dog 1100 back into tooth 1450 if certain operating conditions are met.

FIG. 16A shows the seat 116 (and therefore the dog 1100) moving forwards. As the dog 1100 moves forward, it contacts triangle 1608 of the control member 1600. When the dog 1100 hits the triangle 1608, the control member will want rotate with the dog 1100 in a clockwise direction. However, because the second arm 1606 contacts the adjustable stop 1508, the control member 1600 is prevented from rotating any further and then the triangle 1608 and the control member 1600 hop over the dog, 1100 because the oval hole 1602 allows this radial motion. Because of this, the dog 1100 is now located forward, or to the left of the triangle 1608.

FIG. 16B shows the dog 1100 traveling rearwards. This Figure roughly corresponds to FIG. 15B. However, because of the control member 1600 and especially the location of triangle 1608, the normal escapement operation discussed in above and shown in FIGS. 15A–15D is interrupted. As shown in FIG. 15B, normally dog finger 1102 would contact the lower arm 1702 of the rocker arm 1700. This contact between the lower arm 1702 and the finger 1102 would pivot the dog 1100 into contact with the gear 1400. However, because the triangle 1608 of the control member 1600 is disposed forward of. The lower arm 1702, the triangle 1608 instead of the lower arm 1702, pivots the lower dog 1100 into engagement with the gear 1400.

Because the control member 1600 has interrupted the normal operation of the escapement, discussed above, and because the control member 1600 forces the dog 1100 into contact with the gear 1400 before (i.e. circumiiferentially or torsionally forward of) the lower arm 1702 of the rocker arm 1700 would normally engage the dog 1100 to the gear 1400, a normal hand off has not occurred. This means that the control member 1600 has prevented the dog 1100 from advancing ½ a tooth on gear 1400.

The shape of the dog finger 1102 (concave facing rearwards, concave facing the triangle) prevents the control member 1600 from hopping over the dog finger 1102 initially. The first arm 1604 of the control member 1600 from rotating. These two design features provide enough force to pivot the dog 1100 into contact with the gear 1400 but also does not rigidly fix the control member 1600 in position in view of the oval aperture 1602.

Figure 16C:
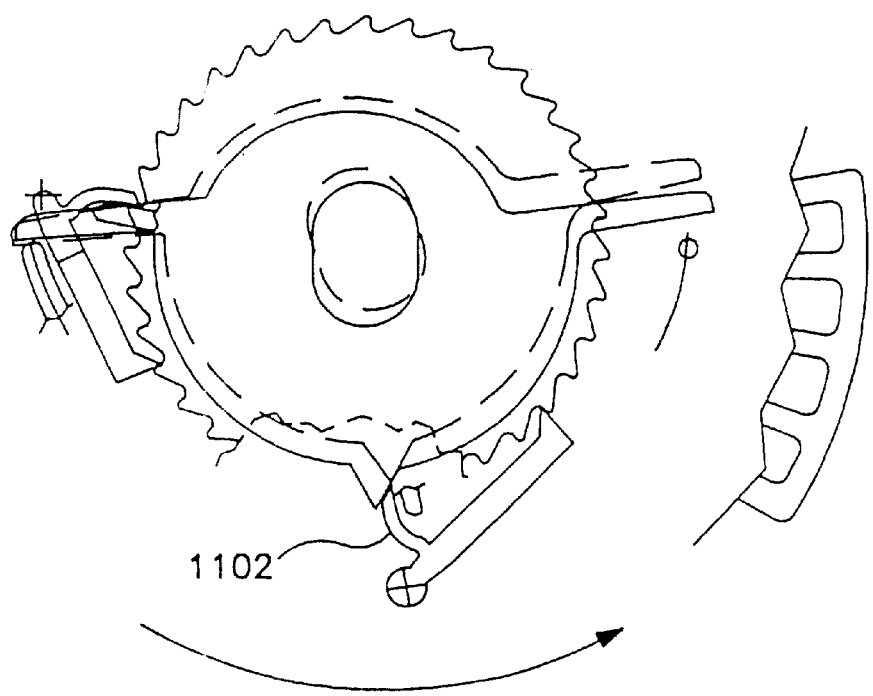

FIG. 16C shows the dog 1100 in a position slightly further rearwards than is shown in FIG. 16B. In FIG. 16C, the dog 1100 has moved rearwards of triangle 1608 because the dog finger 1102 has pushed the control member 1600 upwards. The oval aperture 1602 accommodated this radial motion. After the dog 1100 has moved rearwards or to the right of the control member 1600, the dog 1100 eventually engages the lower arm 1702 of the rocker arm 1700. During this rearward travel of the dog 1100, the system functions the same as the normal escapement shown in FIG. 15C. The pawl 1300 disengages and the seat 116, the dog 1100, the rocker arm 1700 and the gear 1400 all travel together rearwards against the torsion force of the main spring 300.

Figure 16D:
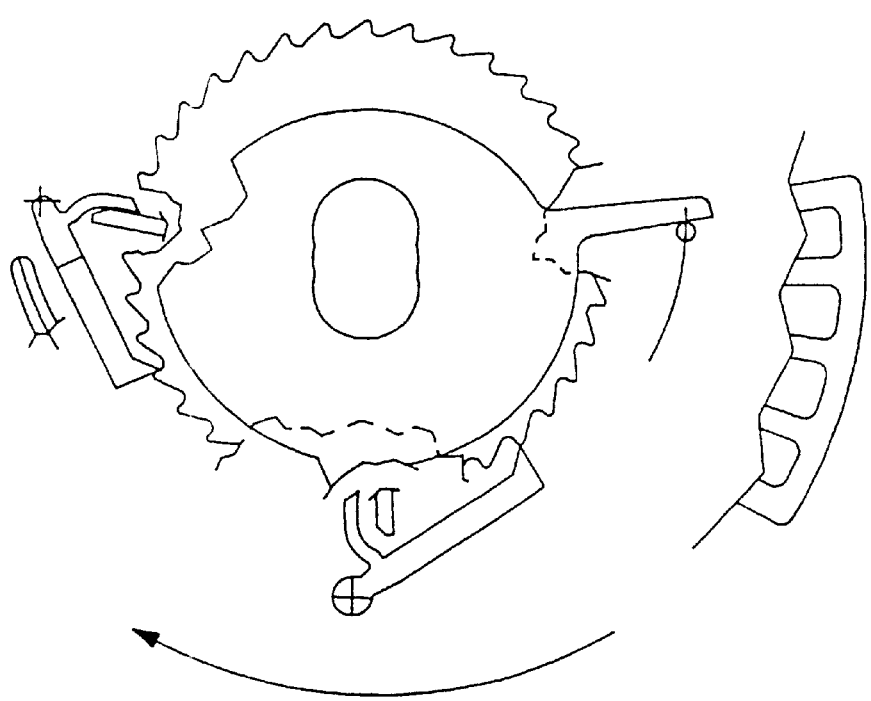

FIG. 16D shows the dog 1100 as it is traveling forward and shows the hand off of the rocker arm from the dog 1100 as it is traveling forward and shows the hand off of the rocker arm from the dog 1100 to the pawl 1300. Because the dog 1100 did not advance on the gear 1400 (by moving to the adjacent tooth) on this cycle, the pawl 1300 will not advance either. Remember that the engagement of pawl 1300 is dependent on the engagement of dog 1100. Because of there has not been an advance this cycle, the main spring 300 will not unwind and will not transfer energy into the swing, and the main spring 300 will maintain or conserve its energy level.

Figure 16E:
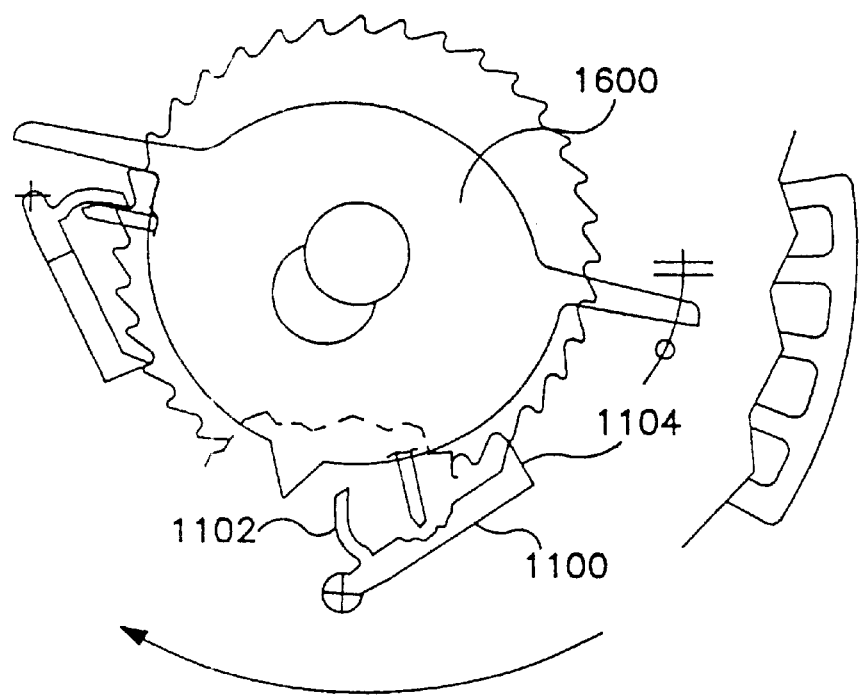
Figure 16F:
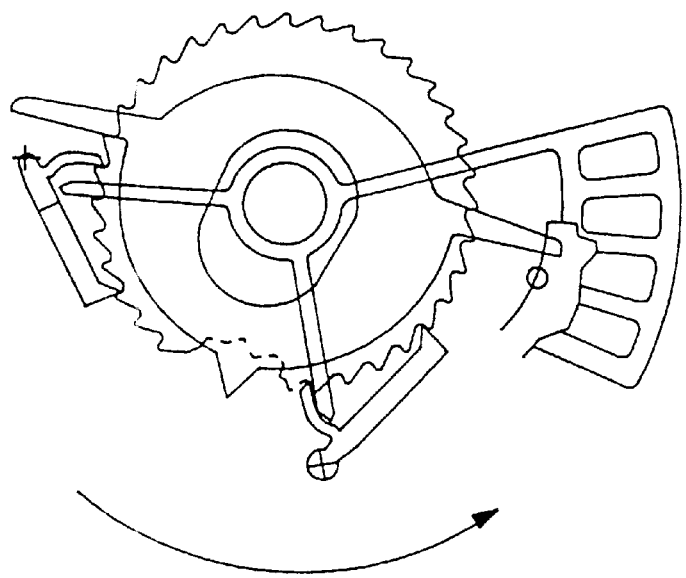

What has just been described and shown in FIGS. 16A–16D is the situation where the control member 1600 interrupts the normal operation of the escapement. FIGS. 16E and 16F show the situation where the control member 1600 does not affect the normal operation of the escapement.

FIG. 16E shows the dog 1100 in its maximum forward travel. Note that in this Figure, unlike FIG. 16A above, the dog 1100 does not travel forward of the triangle 1608 of the control member 1600. In other words, the dog 1100 remains rearward of the triangle 1608 at all times. Because of this, the triangle 1608 does not have the opportunity to interrupt the normal operation of the escapement and the dog 1100 will pivot onto the gear by the normal escapement mechanism. The lower arm 1709 of the rocker arm 1700 will pivot the dog 1100 into engagement with the gear 1400, and, as discussed above, will advance the gear 1400 one tooth. This allows the spring to unwind and provide power to the swing as the swing travels forward.

We can summarize the operation of the control member 1600 by considering the relative positions of the dog 1100 and the triangle 1608. If the dog 1100 is ever to the left, or forward of the triangle 1608, the control member 1600 is "in play" or functions on that cycle. The dog 1100 has moved to the active side of the triangle 1608. If the dog 1100 remains rearward of the triangle 1608 at all times, then the control member is "out of play" and the control member 1600 does not function that cycle. The dog 1100 remains in the inactive region (i.e. to the right or rearward of triangle 1608).

The user can control the height of the swing indirectly with this arrangement. By changing the position of the height adjuster 1500 and the moving stop 1508, the user also changes the position of the triangle 1608. The user can control when the dog 1100 engages the gear. The further forward the triangle 1608 is moved the higher the swing will travel. This is because the control member will only be able to interrupt the normal operation of the escapement on high swings (far forward advancements of dog 1100).

Figure 17B:
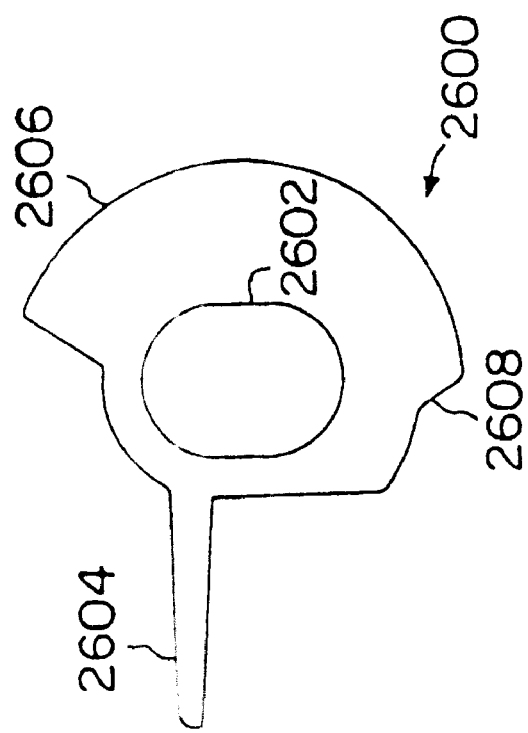
FIG. 17B is a top view of a cam control member.
Figure 17A:
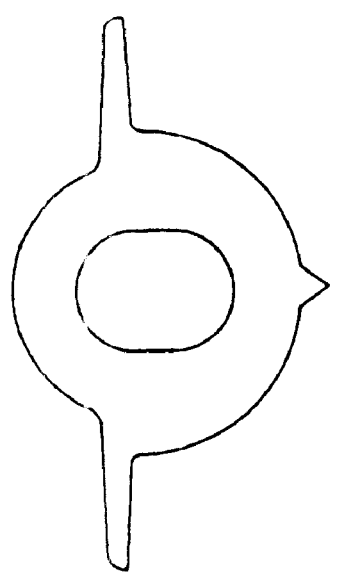
FIG. 17A is a top view of a control member.
Figure 18A:
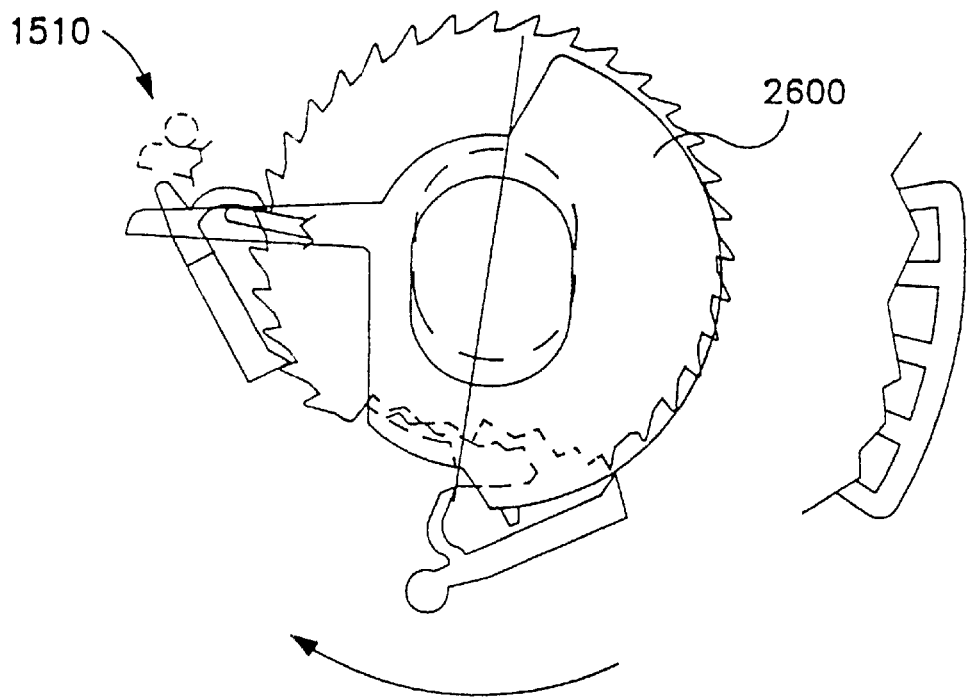
FIGS. 18A–F are operational schematic views of a modified cam control escapement assembly moving, in a forward direction, moving in a rearward direction and showing a dog being pivoted by a control member and engaging a gear, moving in a rearward direction, moving in a forward direction, and showing a pawl engaging a gear, moving in a forward direction, and moving in a rearward direction and showing a dog being pivoted by a rocker arm and engaging a gear.
Figure 18B:
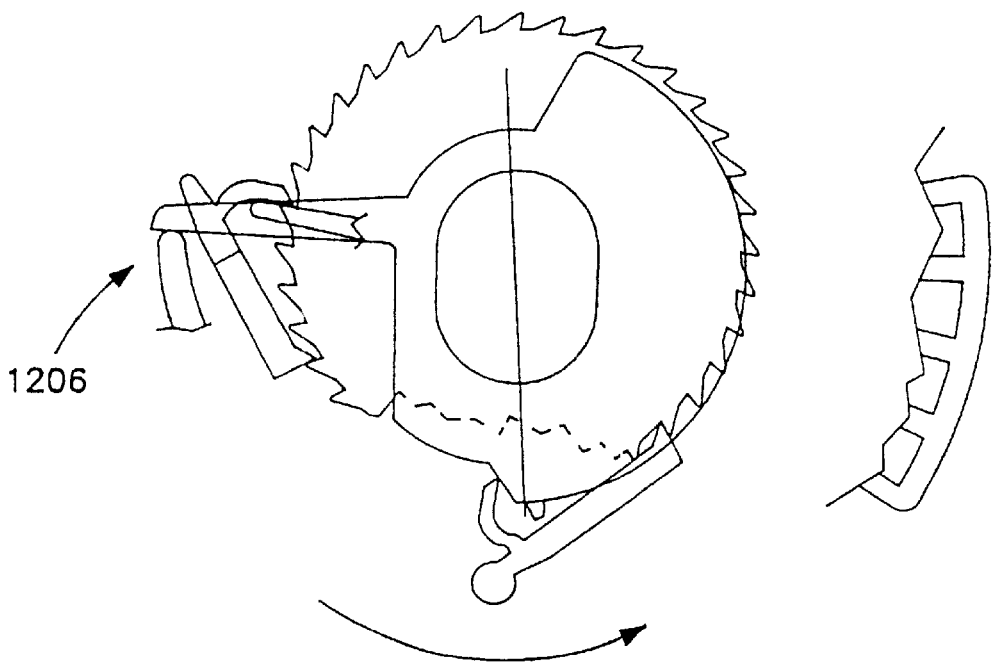
Figure 18C:
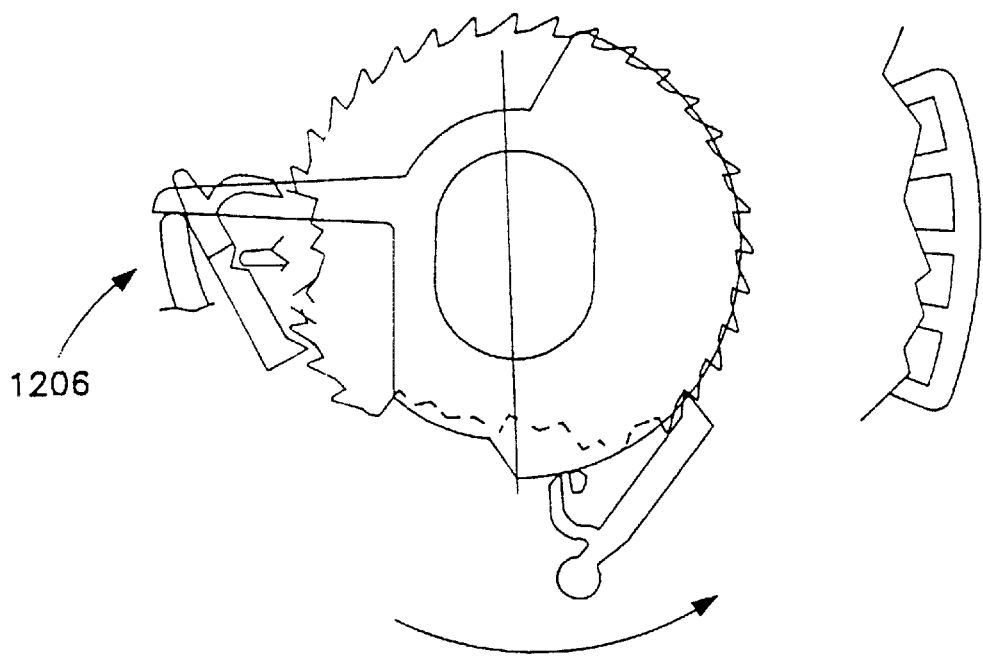

A most preferred embodiment of the height adjustment mechanism is shown in FIGS. 18A 0 18G. FIG. 17 shows the preferred cam control member 2600. The cam control member 2600 has an oval aperture, similar to the normal control member. The cam control member 2600 has an arm 2604 and a cam surface 2606. Cam control member 2600 also has a cam face 2608. Instead of a triangle 1608, the cam control member uses the leading edge or face 2608 of a cam to interact and pivot the dog finger 1102 into engagement with gear 1400.

The cam mechanism is a modified version of the control mechanism 1600, the cam mechanism has a cam face 2608. The cam face 2608 corresponds to the forward face of the triangle 1608.

The cam moving stop 1510 operates on the same side of the gear 1400 as the fixed stop 1206. The cam moving stop 1510, similar to moving stop 1508, controls the location of the cam face 2608. In the present cam embodiment, the location of the cam lace 2608 relative the dog 1100 determines whether the cam member 2608 is active or inactive.

Turing to FIGS. 18A–18F, the cam mechanism functions in the same way as the control mechanism 1600 except for a few modifications. FIGS. 18A–18F correspond to FIGS. 16A–16F. First, as noted above, the triangle 1608 has been replaced with a cam face 2608. The second arm 606 has been eliminated. The cam member 2600 has a first arm 2604 similar to the control member's arm 1604. The cam member 2600 also has a cam surface 2606, the height adjuster 1500 has also been modified. In the control member 1600, the height adjuster 1500 had a movable stop 1508 disposed opposite the fixed stop 1200. However, the height adjuster 1500 adapted for use with the cam member 2600 has the fixed stop moved to a location which is angularly spaced from the fixed stop 1200. See FIG. 18D.

The cam member 2600 operates in a manner similar to that of the control member 1600 with a few variations. The cam face 2608 is designed in a way which allows it to actuate the dog finger 1102. This cam face 2608 replaces the triangle 1608 as the item which pivots the dog 1102. After engagement, the dog finger 1102 slides over the cam surface 2606. See FIG. 18C.

As the dog finger 1102 continues to slide over the cam surface 2606, the dog finger 1102 eventually engages the lower arm 1702. When the dog finger 1102 is engaged to the lower arm 1702, the system which includes the dog 1100, the rocker arm 1700 and the gear 1400 will all move in unison, as the normal escapement. The system will travel rearwards against the torsion force of the main spring 300 and will eventually reach a maximum rearwards against the torsion force of the main spring 300 and will eventually reach a maximum rearwards position. After reaching this maximum rearward position, the system will then start to travel forwards.

Figure 18D:
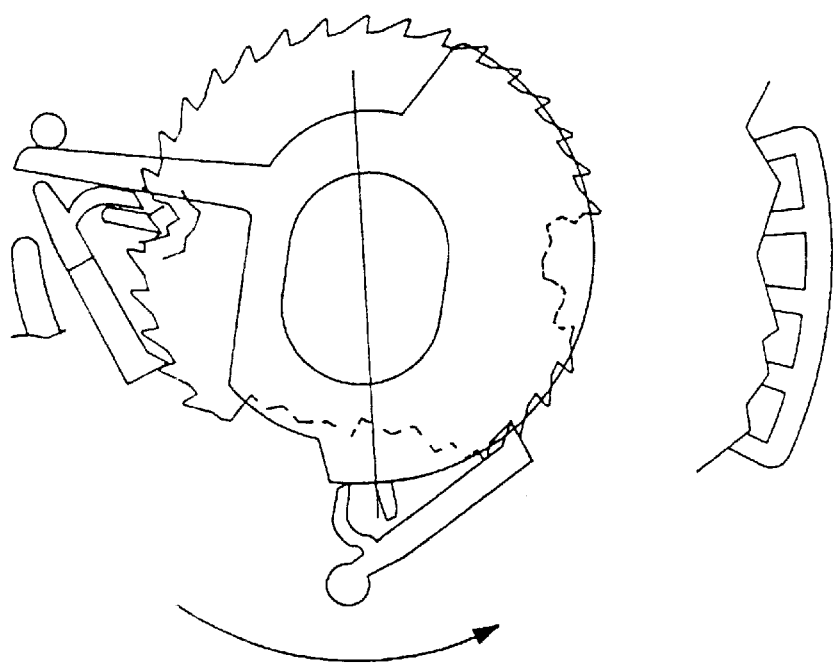

Remembering that both the control member 1600 and the cam member 2600 operate only during rearward travel of the swing and dog 1100, forward movement experiences normal escapement operation. This forward movement is shown in FIG. 18D. The normal escapement operation dictates that, as the system travels forward, the upper arm 1704 of the rocker arm 1700 will actuate the finger 1302 of the pawl 1300. The pawl 1300 will then pivot, and the chisel 1304 of the pawl 1300 will engage the gear 1400. Since, on the rearward travel, the dog 1100 engaged the same tooth that it left the cycle before the pawl 1300 will engage the same tooth that it left on the previous cycle also. This is similar to the operation of the control member 1600 on its forward travel. See FIG. 16D. Because the pawl 1300 enters the same tooth that it left the previous cycle, the gear 1400 does not rotate and therefore, the main spring 300 does not expend any energy this cycle.

Figure 18E:
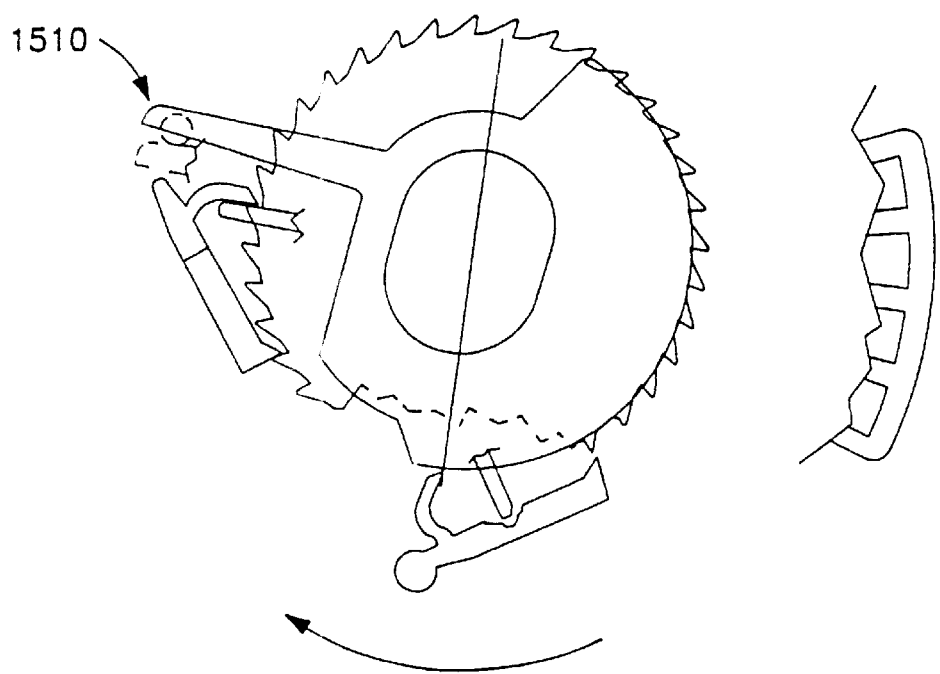
Figure 18F:
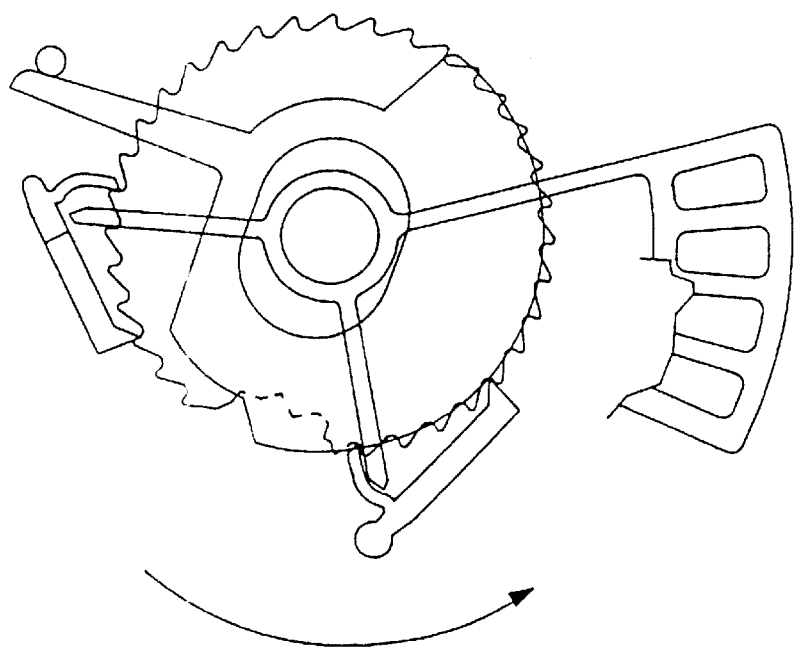

Turning now to FIGS. 18E and 18F, similarly to the control mechanism 1600, if, on the forward swing, the finger 1102 of the dog 1100 does not move forward of the cam face 2608, then the cam member 2600 is inactive or "out of play". In other words, the cam face 2608 does not actuate the dog 1100 into engagement with the gear 1400. Rather, the device will function as the normal escapement mechanism discussed in detail above.

It is apparent that the two control mechanisms control the height of the swing by determining when rotational power is added to the motion of the swing. While both mechanisms function well, the cam control mechanism 2600 is preferred. Although the cam control mechanism 2600 introduces a little more friction into the system (because the dog finger 1102 slides on the cam surface 2606) it is a preferred design for several reasons. First, the cam control mechanism 2600 greatly reduces the irregular and confusing "clicking" sound. The cam control mechanism uses smaller parts, avoids lost motion and allows easy assembly.

It will be apparent to those skilled in the art that various modifications and variations can be made in the motor mechanism for a child's swing of the present invention without departing from the spirit or scope of the invention. Thus, it is intended that the present invention cover the modifications and variations of this invention provided they come within the scope of the appended claims and their equivalents.

What is claimed is:

1. A wind indicator assembly for displaying an amount of energy stored by a spring motor mechanism, comprising:
    a main torsion spring for storing energy, which biases the main spring in a first rotational direction;
    a coupling connecting the main torsion spring;
    a wind indicator having an indicia connected to the coupling; and
    a bias spring connected to the wind indicator and biasing the wind indicator in a second rotational direction opposite to the first rotational direction.

2. The wind indicator assembly according to claim 1, wherein the coupling includes a one way clutch.

3. The wind indicator assembly according to claim 1, wherein the indicia is disposed on an indicator surface that is substantially crescent shaped.

4. The wind indicator assembly according to claim 1, wherein an outer edge of the wind indicator includes a bias spring holder for receiving an end of the bias spring and wherein another end of the bias spring is adopted to be fixed.

5. A wind indicator assembly for displaying an amount of energy stored by a spring motor mechanism, comprising:
    a main spring for storing energy, which biases the main spring in a first rotational direction;
    a coupling collecting the main spring;
    a wind indicator having an indicia connected to the coupling; and
    a bias spring connected to the wind indicator and biasing the wind indicator in a second rotational direction opposite to the first rotational direction;
    wherein the coupling includes a spring cover having an inner cup portion to receive a first end of the main spring and an outer surface having a plurality of teeth.

6. The wind indicator assembly according to claim 5, wherein the coupling includes a backwind stop, the backwind stop being flexible and having a pair of ends that can be flexed together to reduce a backwind stop inner diameter, the back wind stop surrounding the outer surface of the spring cover.

7. The wind indicator assembly according to claim 6, wherein the backwind stop is lightly constricted on the spring cover when the spring is being wound such that the at least one tooth of the working portion is not fully engaged with the spring cover teeth such that no audible sound is generated.

8. The wind indicator assembly according to claim 7, wherein the projecting portion of the backwind stop is mounted within a corresponding groove in the wind indicator.

9. The wind indicator assembly according to claim 6, wherein the backwind stop includes at least one tooth, a flexible portion having a substantially linear shape, a clamping portion having a substantially curved shape, and a projecting portion.

10. A swing comprising:
    a housing;
    a plurality of legs attached to the housing and generally supporting the housing;
    a seat rotatably attached to the housing for supporting a child;
    an energy storage member disposed within the housing for storing energy;
    a mechanism coupled to the energy storage member and the seat, the mechanism providing a preselected discharge of energy from the energy storage member to the seat, the mechanism including an arc controlling device mounted in the housing that prevents the energy storage member from releasing energy stored in the energy storage member when a predetermined swing arc is exceeded.

11. The swing according to claim 10, wherein the mechanism discharges energy from the storage member during a first oscillation and prevents the discharge of energy during a second oscillation.

12. The swing according to claim 10, wherein the housing includes a lower surface with a substantially concave portion.

13. The swing according to claim 10, wherein the lower surface includes a substantially rounded edge.

14. The swing according to claim 10, wherein the housing includes a bottom cover having a plurality of slots for receiving a plurality of seat support hangers.

15. The swing according to claim 10, wherein the energy storage member includes a spring to store and release energy to oscillate the seat.

16. An arc controlling device mounted in a housing of a child swing for controlling the arc of the child swing, the child swing having a child seat rotatably mounted thereto, the device comprising:
    a main spring located in the housing for providing rotational energy unwinding;

a gear fixedly attached to the spring to receive the rotational energy from the spring, the gear rotating as the spring unwinds;

a ratchet wheel;

a pawl pivotably mounted proximate to the ratchet wheel to engage and disengage from the gear to prevent the gear from rotating and the spring from unwinding;

a hanger connected to the child seat;

a dog pivotably mounted to a circular portion of the hanger, the dog engaging and disengaging from the ratchet wheel to receive the rotational energy and transfer the rotational energy to the hanger;

a rocker arm mounted proximate to the dog and pawl, the rocker arm communicating with the dog and pawl to cause the dog and pawl to alternatively engage and disengage the ratchet wheel; and a control member mounted proximate to the dog, the control member engaging the dog to the gear when the arc of the child swing is greater than a desired maximum arc, so as the prevent the spring from unwinding.

17. The swing arc controlling device according to claim 16, wherein the spring includes a plurality of coils and a bent wire portion to connect the spring to the ratchet wheel.

18. The swing arc controlling device according to claim 16, further comprising a finger actuator mounted proximate to the control member to allow a user to adjust the desired maximum arc of the child swing.

19. The swing arc controlling device according to claim 18, wherein the actuator causes the pawl to engage with the gear when the dog disengages from the gear, thereby preventing the gear from uncontrollably rotating.

20. The swing arc controlling device according to claim 16, wherein an oscillating portion includes a molded material and a bent arm portion having a predetermined bend angle.

21. The swing arc controlling device according to claim 16, wherein the dog disengages and engages with consecutive teeth of the gear outer teeth to allow the spring to gradually unwind and transfer energy from the spring to the hanger.

22. The swing arc controlling device according to claim 16, wherein the gear includes a plurality of outer teeth and a plurality of inner teeth.

23. The swing arc controlling device according to claim 22, wherein the pawl includes a chisel portion to engage with the plurality of outer teeth of the gear, a safety portion to engage with the plurality of inner teeth of the gear, and a finger that engages the rocker arm.

24. The swing arc controlling device according to claim 22, wherein the dog includes a chisel portion to engage with the plurality of outer teeth of the gear, a safety portion to engage with the plurality of inner teeth of the gear, and a finger that engages both the rocker arm and the control member.

25. The swing arc controlling device according to claim 16, wherein said pawl has a finger, and the rocker arm include a first arm for engaging with the dog and a second arm for engaging with the pawl finger, the first arm and the second arm being angularly spaced from one another at a predetermined angle.

26. The swing arc controlling device according to claim 25, wherein the gear has teeth, the teeth being disposed about the outer periphery of the gear at regular intervals, the regular intervals being defined as an increment, the predetermined angle being an integer multiple of increments plus one half of an increment.

27. The swing arc controlling device according to claim 16, wherein the control member includes an aperture used to mount the control member on the shaft, the aperture being generally circular with a linear radial portion that allows the control member to move radially with respect to the shaft.

28. The swing arc controlling device according to claim 27, wherein the control member includes an arm designed to contact a moving stop.

29. The swing arc controlling device according to claim 28, further comprising a height adjuster, the height adjuster allowing a user to adjust the position of a moving stop.

30. The swing arc controlling device according to claim 29, wherein the control member includes an arm designed to contact the moving stop, the moving stop being able to control the angular position of the control member.

31. The swing arc controlling device according to claim 30, wherein the control member includes a control surface that is a triangle.

32. The swing arc controlling device according to claim 31, wherein the control member includes a control surface that is a cam surface.

33. The swing arc controlling device according to claim 30, wherein the arm of the control member is disposed on the same side of the gear as a fixed stop.

34. The swing arc controlling device according to claim 30, wherein the dog orbits about the circumference of the gear in relationship to the swinging motion of the seat, and wherein the control member has a first and second position in relationship to the dog, wherein, as the seat swings rearward:

in the first position, the control member is circumferentially forward of the lower arm of the rocker arm and the control member pivots the dog into engagement with the gear, and in a second position, the lower arm of the rocker arm is circumferentially forward of the control member and the lower arm pivots the dog into engagement with the gear.

35. The swing arc controlling device according to claim 34, wherein:

in the first position, the dog engages the gear in a manner that prevents the main spring from contributing rotational energy into the swinging motion of the seat, and in the second position, the dog engages the gear in a manner that allows the main spring to contribute rotational energy into the swinging motion of the seat.

36. The swing arc controlling device according to claim 34, wherein the control member includes a control surface, and the second position of the control member is achieved if the control surface is more circumferentially forward of the forward most point the dog attains.

37. The swing arc controlling device according to claim 34, wherein the aperture of the control member allows the dog to pass from a first location on one side of the control member to a second location on the other side of the control member by accommodating radial upward motion of the control member.

38. The swing arc controlling device according to claim 34, wherein the position of the height adjuster corresponds to a user selected maximum swing arc.

* * * * *

UNITED STATES PATENT AND TRADEMARK OFFICE
CERTIFICATE OF CORRECTION

PATENT NO. : 6,283,870 B1
DATED : September 4, 2001
INVENTOR(S) : Saint et al.

It is certified that error appears in the above-identified patent and that said Letters Patent is hereby corrected as shown below:

<u>Title page,</u>
Item [86], should read as follows:
-- [86]  PCT No.:          PCT/US96/17898
        § 371 Date:        Feb. 19, 1998
        § 102(e) Date:     Feb. 19, 1998 --

Signed and Sealed this

Twentieth Day of August, 2002

*Attest:*

JAMES E. ROGAN
*Attesting Officer*     *Director of the United States Patent and Trademark Office*